US012777473B2

(12) United States Patent
MolavianJazi et al.

(10) Patent No.: US 12,777,473 B2
(45) Date of Patent: Oct. 27, 2026

(54) DORMANCY INDICATION VIA MULTI-CELL SCHEDULING

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 18/626,182

(22) Filed: Apr. 3, 2024

(65) Prior Publication Data

US 2024/0349269 A1 Oct. 17, 2024

Related U.S. Application Data

(60) Provisional application No. 63/545,274, filed on Oct. 23, 2023, provisional application No. 63/464,134, filed on May 4, 2023, provisional application No. 63/459,212, filed on Apr. 13, 2023.

(51) Int. Cl.

*H04W 72/12* (2023.01)
*H04L 1/1812* (2023.01)
*H04W 72/232* (2023.01)

(52) U.S. Cl.

CPC ......... *H04W 72/12* (2013.01); *H04W 72/232* (2023.01)

(58) Field of Classification Search

None

See application file for complete search history.

(56) References Cited

U.S. PATENT DOCUMENTS

| | | | | |
|---|---|---|---|---|
| 2021/0029772 | A1 | 1/2021 | Islam et al. | |
| 2021/0168776 | A1* | 6/2021 | Li | H04L 1/1812 |
| 2021/0329677 | A1* | 10/2021 | Huang | H04W 52/0206 |
| 2022/0046662 | A1* | 2/2022 | Takeda | H04L 5/0053 |
| 2022/0231894 | A1* | 7/2022 | Abdelghaffar | H04L 5/0051 |

(Continued)

FOREIGN PATENT DOCUMENTS

KR 10-2023-0019829 A 2/2023

OTHER PUBLICATIONS

"5G; NR; Physical channels and modulation (3GPP TS 38.211 version 17.4.0 Release 17)", ETSI TS 138 211 V17.4.0, Jan. 2023, 141 pages.

(Continued)

*Primary Examiner* — Duc T Duong

(57) ABSTRACT

Apparatuses and methods for dormancy indication via multi-cell scheduling. A method includes receiving first information for a set of serving cells and a downlink control information (DCI) format. The DCI format schedules reception of a physical downlink shared channel (PDSCH) on a first serving cell from the set of serving cells, includes a frequency domain resource allocation (FDRA) field providing a first value that is associated with the first serving cell and is different from predetermined values, and provides an indication for a dormant or a non-dormant active downlink (DL) bandwidth part (BWP) for each serving cell from second serving cells. The method further includes receiving the PDSCH on the first serving cell and determining the dormant or non-dormant active DL BWP for each serving cell from the second serving cells based on the indication.

20 Claims, 11 Drawing Sheets

(56) References Cited

U.S. PATENT DOCUMENTS

| | | | | |
|---|---|---|---|---|
| 2022/0394682 | A1 | 12/2022 | Nory et al. | |
| 2023/0026953 | A1* | 1/2023 | Zhang | H04W 76/28 |
| 2023/0239792 | A1 | 7/2023 | Xu et al. | |
| 2024/0267931 | A1* | 8/2024 | Zhou | H04W 72/12 |
| 2024/0275518 | A1* | 8/2024 | Takeda | H04L 1/0008 |
| 2026/0006622 | A1* | 1/2026 | Sun | H04W 72/232 |

OTHER PUBLICATIONS

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"5G; NR; Physical layer measurements (3GPP TS 38.215 version 17.2.0 Release 17)", ETSI TS 138 215 V17.2.0, Sep. 2022, 33 pages.

"5G; NR; Medium Access Control (MAC) protocol specification (3GPP TS 38.321 version 17.3.0 Release 17)", ETSI TS 138 321 V17.3.0, Jan. 2023, 254 pages.

"5G; NR; Radio Resource Control (RRC); Protocol specification (3GPP TS 38.331 version 17.3.0 Release 17)", ETSI TS 138 331 V17.3.0, Jan. 2023, 1295 pages.

"5G; NR; NR and NG-RAN Overall description; Stage-2 (3GPP TS 38.300 version 17.4.0 Release 17)", ETSI TS 138 300 V17.4.0, Apr. 2023, 213 pages.

International Search Report and Written Opinion issued Jul. 11, 2024 regarding International Application No. PCT/KR2024/004894, 6 pages.

Qualcomm, "UE features for MC enhancements", 3GPP TSG RAN WG1 #112bis-e, R1-2303621, Apr. 2023, 12 pages.

* cited by examiner

DORMANCY INDICATION VIA MULTI-CELL SCHEDULING

CROSS-REFERENCE TO RELATED AND CLAIM OF PRIORITY

The present application claims priority under 35 U.S.C. § 119(e) to U.S. Provisional Patent Application No. 63/459,212 filed on Apr. 13, 2023; U.S. Provisional Patent Application No. 63/464,134 filed on May 4, 2023; and U.S. Provisional Patent Application No. 63/545,274 filed on Oct. 23, 2023, which are hereby incorporated by reference in their entirety.

TECHNICAL FIELD

The present disclosure relates generally to wireless communication systems and, more specifically, the present disclosure is related to apparatuses and methods for dormancy indication via multi-cell scheduling.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to dormancy indication via multi-cell scheduling.

In one embodiment, a method is provided. The method includes receiving first information for a set of serving cells and a downlink control information (DCI) format. The DCI format schedules reception of a physical downlink shared channel (PDSCH) on a first serving cell from the set of serving cells, includes a frequency domain resource allocation (FDRA) field providing a first value that is associated with the first serving cell and is different from predetermined values, and provides an indication for a dormant or a non-dormant active downlink (DL) bandwidth part (BWP) for each serving cell from second serving cells. The indication is provided by values of first fields in the DCI format that are associated with a third serving cell from the set of serving cells when the dormancy indication field is not present in the DCI format or is reserved second fields are not present in the DCI format or are reserved, and a third value of the FDRA field in the DCI format that is associated with the third serving cell is one of the predetermined values. The second fields include at least one of a dormancy indication field, a one-shot hybrid automatic repeat request acknowledgment (HARQ-ACK) request field, and a HARQ-ACK retransmission indicator field. The method further includes receiving the PDSCH on the first serving cell and determining the dormant or non-dormant active DL BWP for each serving cell from the second serving cells based on the indication.

In another embodiment, a user equipment (UE) is provided. The UE includes a transceiver and a processor. The transceiver is configured to receive first information for a set of serving cells, a DCI format. The DCI format schedules reception of a PDSCH on a first serving cell from the set of serving cells, includes a FDRA field providing a first value that is associated with the first serving cell and is different from predetermined values, and provides an indication for a dormant or a non-dormant active DL BWP for each serving cell from second serving cells. The indication is provided by values of first fields in the DCI format that are associated with a third serving cell, from a third serving cell from the set of serving cells when the dormancy indication field is not present in the DCI format or is reserved, second fields are not present in the DCI format or are reserved, and a third value of the FDRA field in the DCI format that is associated with the third serving cell is one of the predetermined values. The second fields include at least one of a dormancy indication field, a one-shot hybrid automatic repeat request acknowledgment (HARQ-ACK) request field, and a HARQ-ACK retransmission indicator field. The transceiver is further configured to receive the PDSCH on the first serving cell. The processor is configured to determine the dormant or non-dormant active DL BWP for each serving cell from the second serving cells based on the indication.

In yet another embodiment, a base station is provided. The base station includes a transceiver and a processor. The transceiver is configured to transmit first information for a set of serving cells, a DCI format. The DCI format schedules a transmission of a PDSCH on a first serving cell from the set of serving cells, includes a FDRA field providing a first value that is associated with the first serving cell and is different from predetermined values, and provides an indication for a dormant or a non-dormant active DL BWP for each serving cell from second serving cells. The indication is provided by values of first fields in the DCI format that are associated with a third serving cell, from a third serving cell from the set of serving cells when the dormancy indication field is not present in the DCI format or is reserved, second fields are not present in the DCI format or are reserved, and a third value of the FDRA field in the DCI format that is associated with the third serving cell is one of the predetermined values. The second fields include at least one of a dormancy indication field, a one-shot hybrid automatic repeat request acknowledgment (HARQ-ACK) request field, and a HARQ-ACK retransmission indicator field. The transceiver is further configured to transmit the PDSCH on the first serving cell. The processor is configured to determine the dormant or non-dormant active DL BWP for each serving cell from the second serving cells based on the indication.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-11, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 v 17.4.0, "NR; Physical channels and modulation;" [2] 3GPP TS 38.212 v 17.4.0, "NR; Multiplexing and Channel coding;" [3] 3GPP TS 38.213 v 17.4.0, "NR; Physical Layer Procedures for Control;" [4] 3GPP TS 38.214 v 17.4.0, "NR; Physical Layer Procedures for Data;" [5] 3GPP TS 38.215 v 17.2.0, "NR; Physical Layer Measurements;" [6] 3GPP TS 38.321 v 17.3.0, "NR; Medium Access Control (MAC) protocol specification;" [7] 3GPP TS 38.331 v 17.3.0, "NR; Radio Resource Control (RRC) Protocol Specification;" and [8] 3GPP TS 38.300 Rel-16 v 17.4.0, "NR; NR and NG-RAN Overall Description; Stage 2."

Figure 1:
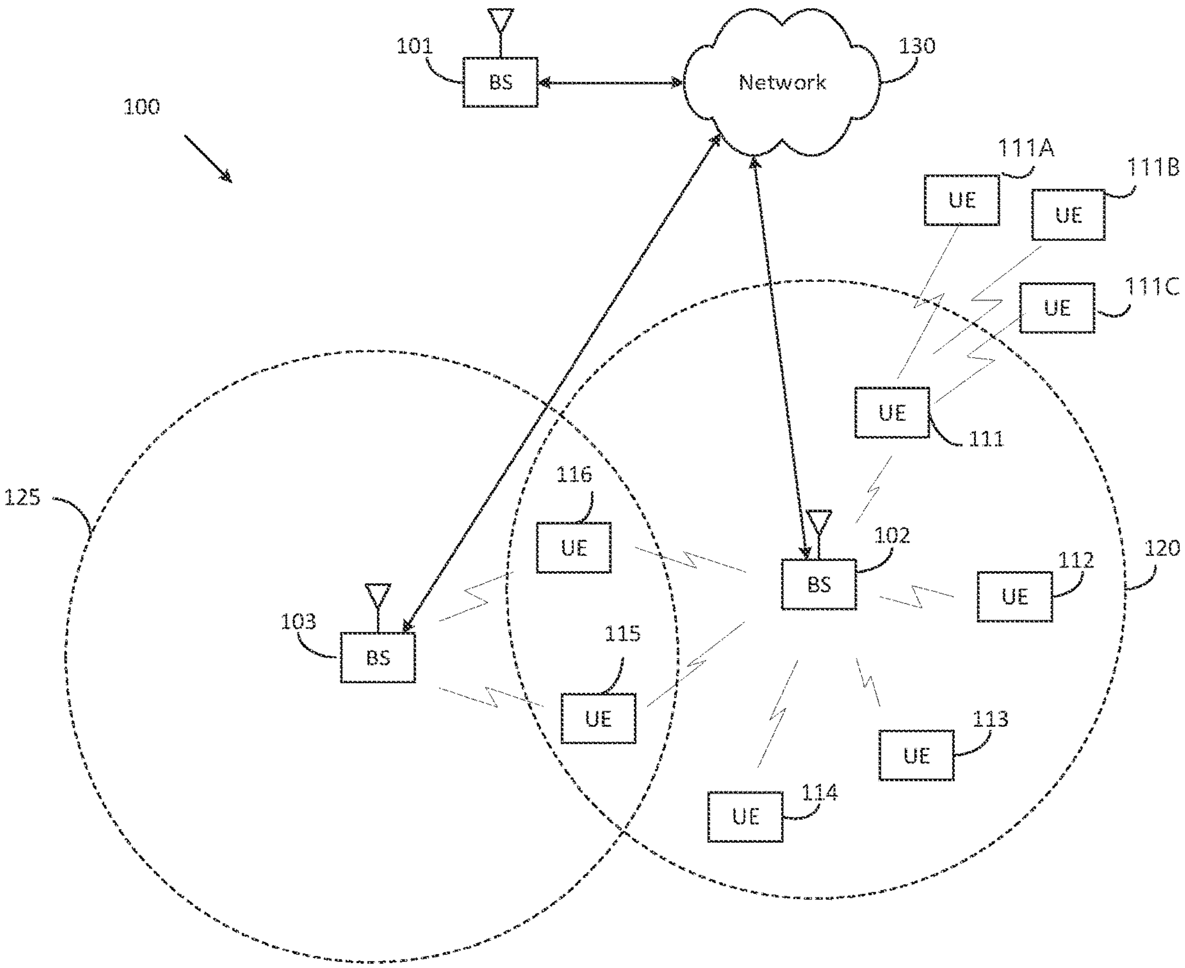
FIG. 1 illustrates an example wireless network according to embodiments of the present disclosure.
Figure 2:
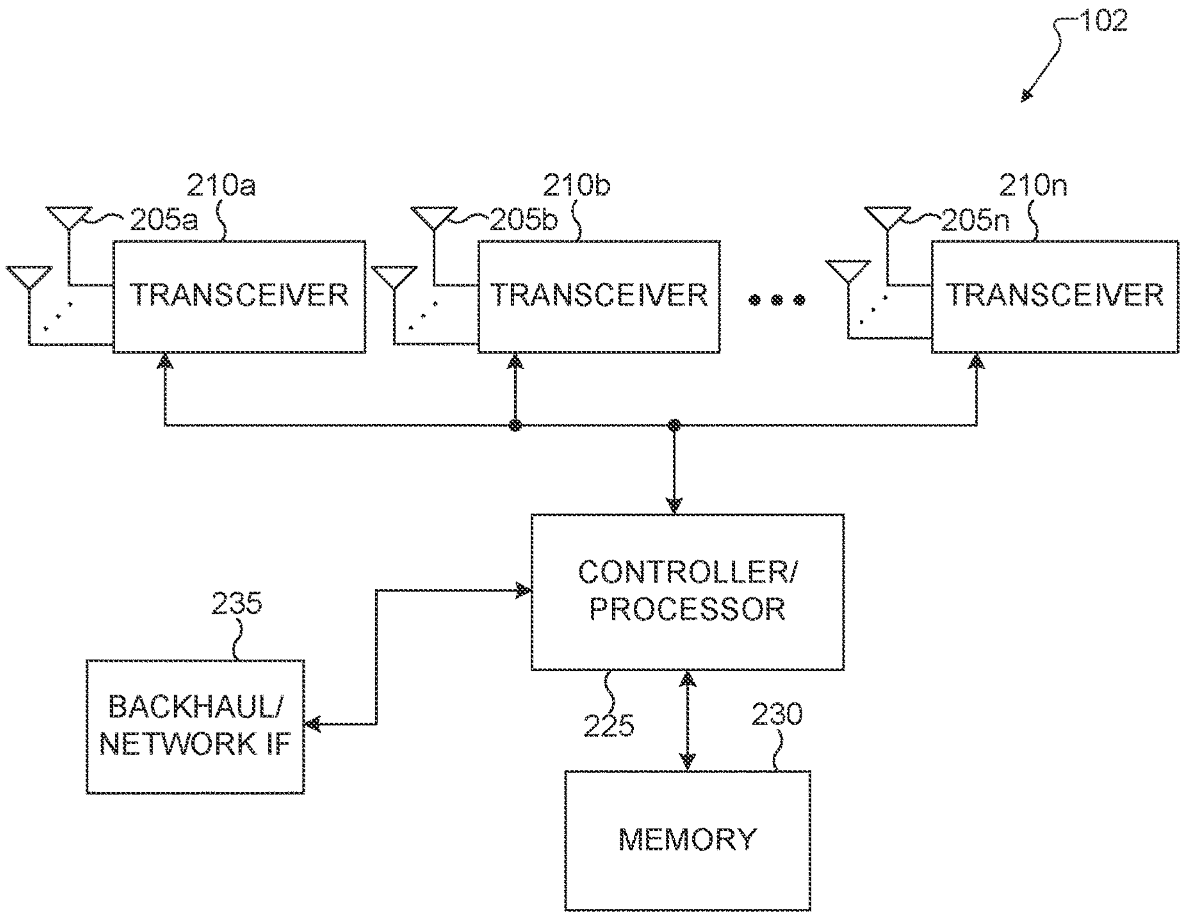
FIG. 2 illustrates an example gNodeB (gNB) according to embodiments of the present disclosure.
Figure 3:
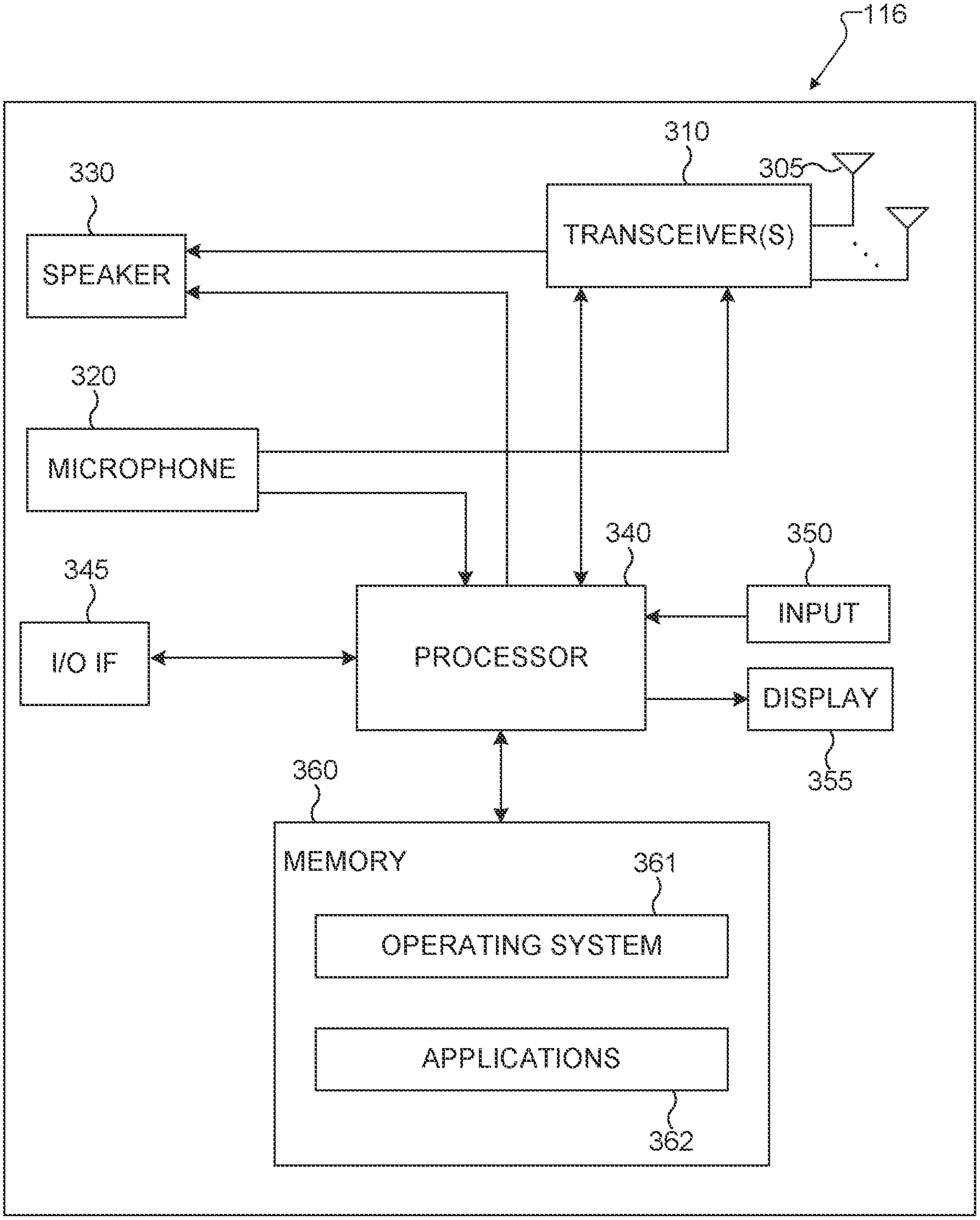
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, longterm evolution (LTE), longterm evolution-advanced (LTE-A), WiMAX, WiFi, or other wireless communication techniques.

In another example, the UE may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication and/or positioning.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for dormancy indication via multi-cell scheduling. In certain embodiments, and one or more of the gNBs 101-103 includes circuitry, programing, or a combination thereof, for supporting dormancy indication via multi-cell scheduling.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers

210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channels and/or signals and the transmission of DL channels and/or signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting dormancy indication via multi-cell scheduling. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE according to embodiments of the present disclosure. The embodiment of the UE illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE includes antenna(s) 305, a transceiver(s) 310, and a microphone 320. The UE also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals and SL channels and/or signals and the transmission of UL channels and/or signals and SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for dormancy indication via multi-cell scheduling.

The processor 340 can move data into or out of the memory 360 as required by an executing process. In some embodiments, the processor 340 is configured to execute the applications 362 based on the OS 361 or in response to signals received from gNBs, another UE, or an operator. The processor 340 is also coupled to the I/O interface 345, which provides the UE with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE configured as a mobile telephone or smartphone, UEs could be configured to operate as other types of mobile or stationary devices.

Figure 4A:
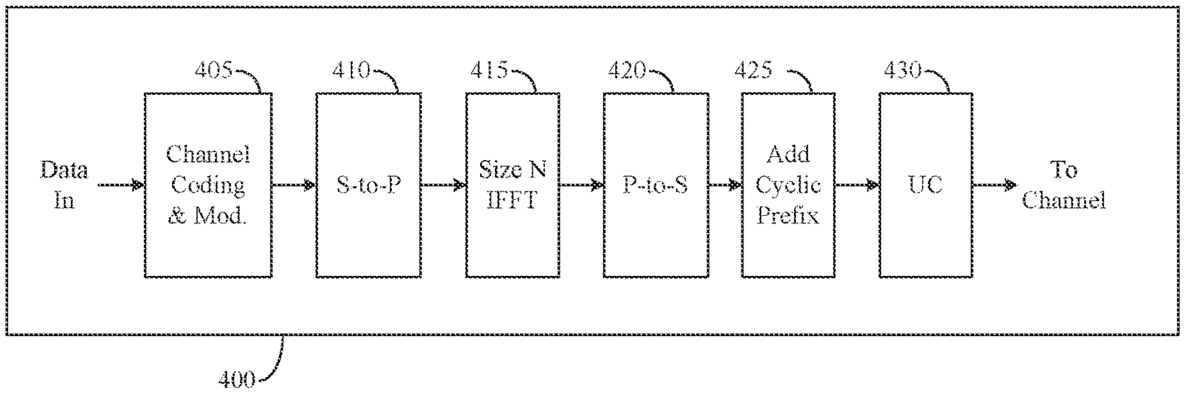
FIGS. 4A and 4B illustrate an example of a wireless transmit and receive paths according to embodiments of the present disclosure.
Figure 4B:
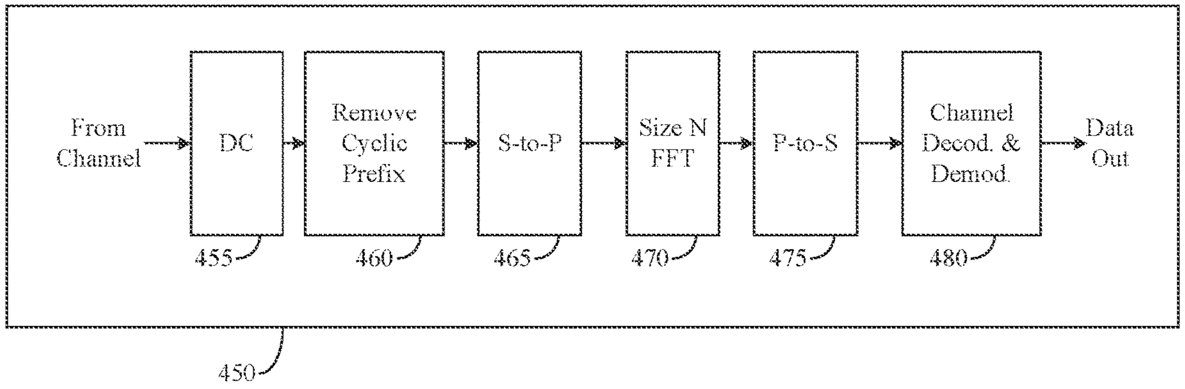

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. It will be understood that the receive path 450 can be implemented in a first UE and that the transmit path 400 can be implemented in a second UE. In some embodiments, the transmit path 400 and/or receive path 450 is configured for dormancy indication via multi-cell scheduling as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 or for transmitting in the sidelink to another UE and may implement a receive path 450 for receiving in the downlink from gNBs 101-103 or for receiving in the sidelink from another UE.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., Synchronization Signal/Physical Broadcast Channel (SS/PBCH) block) (SSB) and/or Channel State Information Reference Signal (CSI-RS)) and a target RS or a spatial relation information that establishes an association to a source RS, such as SSB or CSI-RS or sounding RS (SRS). In either case, the ID of the source reference signal identifies the beam. The TCI state and/or the spatial relation reference RS can determine a spatial RX filter for reception of downlink channels at the UE, or a spatial TX filter for transmission of uplink channels from the UE.

Figure 5:
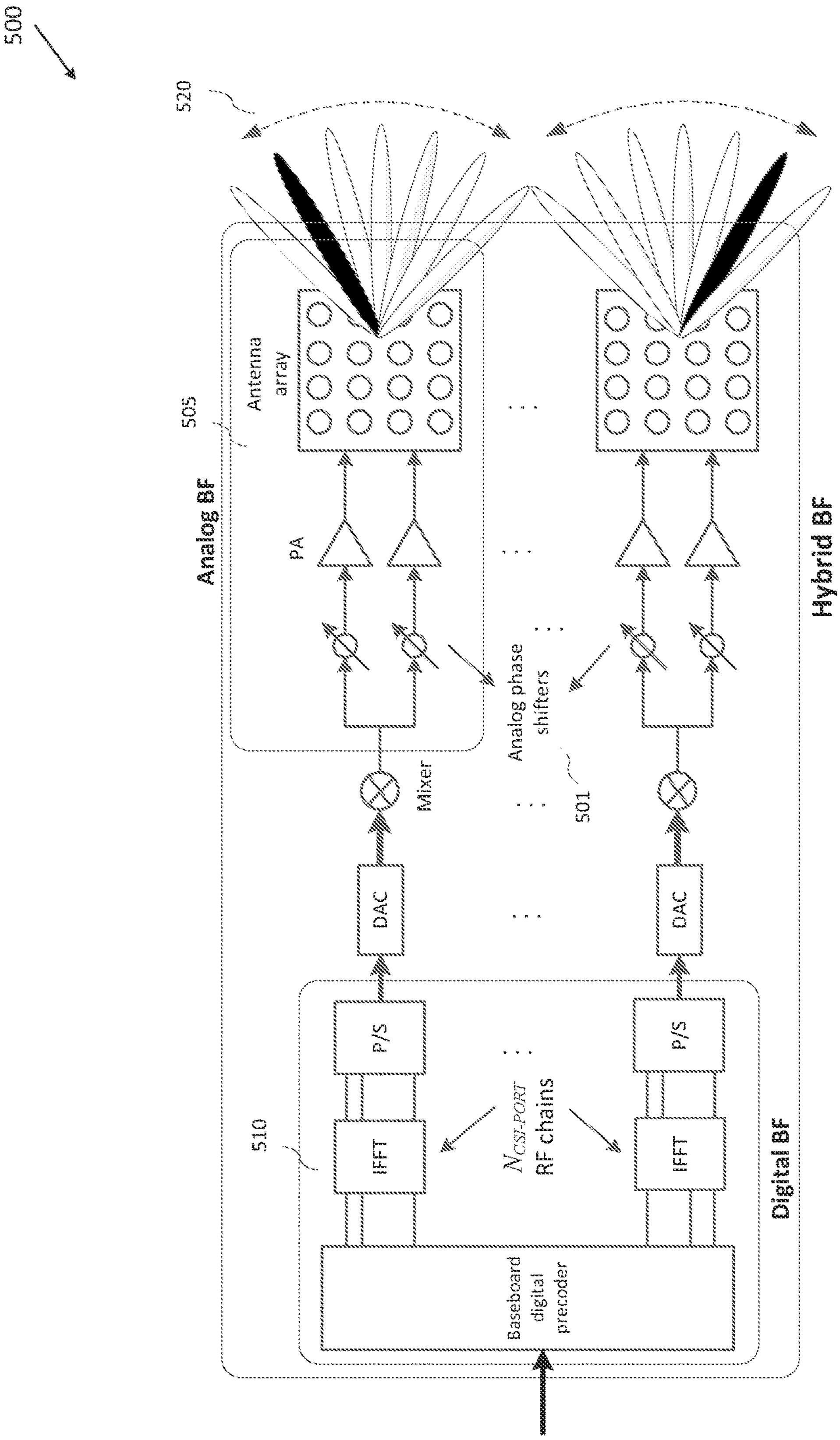
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE includes the transmitter structure 500. For example, one or more of antennas 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz. In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 500 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

A description of example embodiments is provided on the following pages.

Any of the variation embodiments can be utilized independently or in combination with at least one other variation embodiment.

Throughout this disclosure, all Figures such as FIG. 1, FIG. 2, and so on, illustrate examples according to embodiments of the present disclosure. For each FIGURE, the corresponding embodiment shown in the FIGURE is for illustration only. One or more of the components illustrated in each FIGURE can be implemented in specialized circuitry configured to perform the noted functions or one or more of the components can be implemented by one or more processors executing instructions to perform the noted functions. Other embodiments could be used without departing from the scope of the present disclosure. In addition, the descriptions of the Figures are not meant to imply physical or architectural limitations to the manner in which different embodiments may be implemented. Different embodiments of the present disclosure may be implemented in any suitably-arranged communications system.

The present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by MIB or a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with SCells or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in [REF3, TS 38.213].

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with an RMSI, the SSB is referred to as a Cell-Defining SSB (CD-SSB). A PCell is associated to a CD-SSB located on the synchronization raster.

Polar coding is used for PBCH. The UE may assume a band-specific sub-carrier spacing for the SSB unless a network has configured the UE to assume a different sub-carrier spacing. PBCH symbols carry its own frequency-multiplexed DMRS. QPSK modulation is used for PBCH.

Measurement time resource(s) for SSB-based RSRP measurements may be confined within a SSB Measurement Time Configuration (SMTC). The SMTC configuration provides a measurement window periodicity/duration/offset information for UE RRM measurement per carrier frequency. For intra-frequency connected mode measurement, up to two measurement window periodicities can be configured. For RRC_IDLE, a single SMTC is configured per carrier frequency for measurements. For inter-frequency mode measurements in RRC_CONNECTED, a single SMTC is configured per carrier frequency. Note that if RSRP is used for L1-RSRP reporting in a CSI report, the measurement time resource(s) restriction provided by the SMTC window size is not applicable. Similarly, measurement time resource(s) for RSSI are confined within SMTC window duration. If no measurement gap is used, RSSI is measured over OFDM symbols within the SMTC window duration. If a measurement gap is used, RSSI is measured over OFDM symbols corresponding to overlapped time span between SMTC window duration and minimum measurement time within the measurement gap.

Throughout the present disclosure, the term signal quality is used to refer to e.g., RSRP or RSRQ or RSSI or SNR or SINR, with or without filtering such as L1 or L3 filtering, of a channel or a signal such as a reference signal (RS) including SSB, CSI-RS, or SRS.

The present disclosure evaluates enhancements for a carrier aggregation (CA) framework to support joint scheduling of multiple cells.

In legacy 5G NR systems, a downlink or uplink data transmission can be scheduled only for a single serving cell. In other words, a DCI format provides scheduling information parameters for a PDSCH or a physical uplink shared channel (PUSCH) on a single serving cell. If the serving cell is a scheduled cell, the UE receives a DCI format for the PDSCH/PUSCH in a physical downlink control channel (PDCCH) that the UE receives on a corresponding scheduling cell. Based on a carrier indication field (CIF) in the DCI format, the UE can determine a serving cell on which the UE can receive the PDSCH or transmit the PUSCH.

However, legacy NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs. Such operation achieves the intended outcome, but with possibly high signaling overhead. In various scenarios, several scheduling parameters or corresponding UE operations are shared/common among the multiple PDSCHs or PUSCHs on the jointly scheduled cells, referred to as co-scheduled cells.

To facilitate UE power saving, the UE can be indicated to switch an active bandwidth part (BWP) of a secondary cell (SCell) to a dormant BWP, wherein the UE can operate with limited procedures, such as limited/no PDCCH monitoring. SCell dormancy indication can be provided to the UE via a DCI format that indicates to the UE to switch to a dormant BWP from another BWP or vice versa. In NR Rel-16/17, a single-cell scheduling DCI (SC-DCI) format, such as DCI formats 0_1 or 1_1, can provide SCell dormancy indication by using an explicit field, together with PUSCH/PDSCH scheduling. Additionally, a DCI format 1_1 can provide SCell dormancy indication without PDSCH scheduling, by repurposing some of the DCI fields, such as modulation and coding scheme (MCS)/new data indicator (NDI)/redundancy version (RV) for transport block 1 and HARQ process number (HPN), Antenna port(s), demodulation reference signal (DMRS) sequence initialization, that would be otherwise used for PDSCH scheduling.

Embodiment of the present disclosure recognize there is a need to enable SCell dormancy indication using a multi-cell scheduling DCI (MC-DCI) format, such as DCI format 0_3 or 1_3, with or without data scheduling.

The present disclosure provides methods and apparatus for SCell dormancy indication via a multi-cell scheduling DCI format.

One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively. In general, the embodiments apply to any deployments, verticals, or scenarios including inter-band CA, with enhanced mobile broadband (eMBB), ultra reliable low latency communications (URLLC) and industrial internet of things (IIoT) and extended reality (XR), massive machine-type communications (mMTC) and internet of things (IoT), with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the present disclosure for supporting multi-cell scheduling with reduced signaling overhead are summarized in the following and are fully elaborated further below. Combinations of the embodiments are also applicable, but they are not described in detail for brevity.

A UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described in one or more embodiments herein. Additionally, the UE can be indicated via a DCI format in a PDCCH or via a MAC control element (CE) in a PDSCH a subset of a set of co-scheduled cells, wherein cells of the subset can change across different PDCCH monitoring occasions, for example, as indicated by a corresponding DCI format.

The UE can distinguish a single-cell scheduling DCI format from a multi-cell scheduling DCI format via various methods, such as a DCI format size, or an radio network temporary identifier (RNTI) used for scrambling a cyclic redundancy check (CRC) of a DCI format for multi-cell scheduling, or by an explicit indication by a field in the DCI format, or by a dedicated CORESET and associated search space sets.

The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

In one embodiment, when a UE is configured a number of sets of cells for multi-cell scheduling, the UE can be provided SCell dormancy indication via a multi-cell scheduling DCI format 0_3 or 1_3 that schedules one or more PUSCHs/PDSCHs on one or more cells in a set of cells, from the number of sets of cells for multi-cell scheduling. The DCI format can correspond to an RRC-configured or a reference/predetermined set of cells or combination of co-scheduled cells or a set/combination of cells that is selected by the gNB 102.

In one embodiment, a DCI format 0_3/1_3 can both provide SCell dormancy indication using an explicit DCI field and schedule PDSCHs/PUSCHs on the PCell or one or more SCells.

In one embodiment, a DCI format can provide reserved values for first DCI fields, such as an frequency domain resource assignment (FDRA)field of a DCI format 1_3, to validate SCell dormancy indication, and can repurpose second DCI fields of the DCI format to provide a bitmap to configured SCells or to respective groups of one or more SCells, for SCell dormancy indication. The SCells in a group of SCells can be indicated in advance by higher layers. For example, the first and second DCI fields can correspond to the PCell or one or more SCells, such as a reference SCell or SCells selected by the gNB 102. The DCI format can schedule PDSCHs on other cells with corresponding fields not used/repurposed for SCell dormancy indication.

In one embodiment, when a DCI format 0_3/1_3 provides SCell dormancy indication and also schedules PUSCHs/PDSCHs on some cells from a corresponding set of cells, the UE transmits PUSCHs or receives PDSCHs on the PCell or on activated SCells that have a non-dormant BWP and are not indicated by SCell dormancy indication of the DCI format 0_3/1_3 to switch to a dormant BWP. In another option, the UE can transmit PUSCHs or receive PDSCHs on SCells with active non-dormant BWP before switching to a dormant BWP as indicated by the SCell dormancy indication provided by the DCI format 0_3/1_3, at least when the UE has sufficient time for such PUSCH transmission or PDSCH reception before switching to dormant BWP or by delaying a BWP switching operation.

In one embodiment, a UE provides HARQ-ACK information in response to a DCI format 1_3 that provides SCell dormancy indication, at least/only when the DCI format 1_3 does not schedule any PDSCHs on any cells. In another option, the UE provides a separate one bit of HARQ-ACK information in response to the DCI format 1_3 (to acknowledge a reception of the SCell dormancy indication) also when the DCI format 1_3 schedules PDSCHs on some cells in a corresponding set of cells. The UE provides the one bit HARQ-ACK for the DCI format in same or different Type-2 HARQ-ACK sub-codebook that the UE provides a number of HARQ-ACK information bits corresponding to the PDSCHs scheduled by the DCI format. In one example, the UE provides a HARQ-ACK information bit, such as an ACK, (or 2 ACKs when configured with 2 transport blocks (TBs) per PDSCH) for each cell in a cell combination indicated by the DCI format 1_3 when the UE is not scheduled to receive a PDSCH on the cell and the cell is indicated to switch to dormant BWP.

Throughout the present disclosure, the term "configuration" or "higher layer configuration" and variations thereof (such as "configured" and so on) are used to refer to one or more of: a system information signaling such as by a master information block (MIB) or a system information block (SIB) (such as SIB1), a common or cell-specific higher layer/RRC signaling, or a dedicated or UE-specific or BWP-specific higher layer/RRC signaling.

Throughout the present disclosure, the term signal quality is used to refer to e.g., reference signal received power (RSRP), or reference signal received quality (RSRQ) or received signal strength indicator (RSSI) or signal-to-noise ratio (SNR) or signal to interference and noise ratio (SINR), with or without filtering such as L1 or L3 filtering, of a channel or a signal such as a reference signal (RS) including SSB, CSI-RS, or SRS.

An antenna port is defined such that the channel over which a symbol on the antenna port is conveyed can be inferred from the channel over which another symbol on the same antenna port is conveyed.

For DMRS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code-division multiplexing (CDM) group are quasi co-located with respect to Doppler shift, Doppler spread, average delay, delay spread, and spatial Rx. The UE may also assume that DMRS ports associated with a PDSCH are QCL with QCL Type A, Type D (when applicable) and average gain. The UE may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location (QCL) relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The UE receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $$n+3N_{slot}^{subframe,\mu} \text{ where } N_{slot}^{subframe,\mu}$$

is a number of slot per subframe for subcarrier spacing (SCS) configuration p.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD':

the UE may assume that the DM-RS ports of PDSCH(s) of a serving cell are quasi co-located with the RS(s) with respect to the quasi co-location (QCL) parameter(s) used for PDCCH quasi co-location indication of the CORESET associated with a monitored search space with the lowest controlResourceSetId in the latest slot in which one or more CORESETs within the active BWP of the serving cell are monitored by the UE 116. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCIStatePerCoresetPoolIndex and the UE is configured by higher layer parameter PDCCH-Config that contains two different values of coresetPoolIndex in different ControlResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE 116. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In all cases herein, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier:

The timeDurationForQCL is determined based on the subcarrier spacing of the scheduled PDSCH. If $\mu_{PDCCH}<\mu_{PDSCH}$ an additional timing delay $$d\frac{2^{\mu_{PDSCH}}}{2^{\mu_{PDCCH}}}$$

is added to the timeDurationForQCL, where d is defined in 5.2.1.5.1a-1, otherwise d is zero.

For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-ForPUSCH0-0 is set 'enabled', the UE is not configured with physical uplink control channel (PUCCH) resources on the active UL BWP and the UE is in RRC connected mode. The UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-ForPUSCH0 is set 'enabled', the UE is configured with PUCCH resources on the active UL BWP where all the PUCCH resource(s) are not configured with any spatial relation and the UE is in RRC connected mode. The UE shall transmit PUSCH according to the spatial relation, if applicable, with a reference to the RS configured with qcl-Type set to 'typeD' corresponding to the QCL assumption of the CORESET with the lowest ID on the active DL BWP of the cell in case CORESET(s) are configured on the cell.

In Carrier Aggregation (CA), two or more Component Carriers (CCs) are aggregated. A UE may simultaneously receive or transmit on one or multiple CCs depending on its capabilities:

A UE with single timing advance capability for CA can simultaneously receive and/or transmit on multiple CCs corresponding to multiple serving cells sharing the same timing advance (multiple serving cells grouped in one TAG);

A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell; and/or A non-CA capable UE can receive on a single CC and transmit on a single CC corresponding to one serving cell only (one serving cell in one TAG).

CA is supported for both contiguous and non-contiguous CCs. When CA is deployed frame timing and system frame number (SFN) are aligned across cells that can be aggregated, or an offset in multiples of slots between the primary cell (PCell)/primary secondary cell (PSCell) and an SCell is configured to the UE 116. The maximum number of configured CCs for a UE is 16 for DL and 16 for UL.

When CA is configured, the UE only has one RRC connection with the network 130. At RRC connection establishment/re-establishment/handover, one serving cell provides the non access stratum (NAS) mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore includes one PCell and one or more SCells.

The reconfiguration, addition, and removal of SCells can be performed by RRC. At intra-NR handover and during connection resume from RRC_INACTIVE, the network 130 can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells:

SCells added to the set are initially activated or deactivated; and/or

SCells which remain in the set (either unchanged or reconfigured) do not change their activation status (activated or deactivated).

At handover or connection resume from RRC_INACTIVE:

SCells are activated or deactivated.

To enable reasonable UE battery consumption when BA is configured, only one UL BWP for each uplink carrier and one DL BWP or only one DL/UL BWP pair can be active at a time in an active serving cell. All other BWPs that the UE is configured with being deactivated. On deactivated BWPs, the UE does not monitor the PDCCH, does not transmit on PUCCH, physical random-access channel (PRACH) and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, automatic gain control (AGC) and beam management, if configured. A DCI is used to control entering/leaving the dormant BWP for one or more SCell(s) or one or more SCell group(s).

The dormant BWP is one of the UE 116's dedicated BWPs configured by network via dedicated RRC signalling. The SpCell and PUCCH SCell cannot be configured with a dormant BWP.

Cross-carrier scheduling with the Carrier Indicator Field (CIF) allows the PDCCH of a serving cell to schedule resources on another serving cell but with the following restrictions:

Cross-carrier scheduling does not apply to PCell i.e., PCell is scheduled via its PDCCH;

When an SCell is configured with a PDCCH, that cell's PDSCH and PUSCH are scheduled by the PDCCH on this SCell;

When an SCell is not configured with a PDCCH, that SCell's PDSCH and PUSCH are scheduled by a PDCCH on another serving cell; and/or The scheduling PDCCH and the scheduled PDSCH/PUSCH can use the same or different numerologies.

Some of the restrictions herein may be relaxed. For example, dynamic spectrum sharing (DSS) allows LTE and NR to share the same carrier. As the number of NR devices in a network increases, it is important that sufficient scheduling capacity for NR UEs on the shared carriers is ensured. In the case of DSS operation, PDCCH enhancements for cross-carrier scheduling including can be regarded such that PDCCH of an SCell, referred to as a special/scheduling SCell (sSCell), can schedule PDSCH or PUSCH on the P(S)Cell.

The Physical Downlink Control Channel (PDCCH) can be used to schedule DL transmissions on PDSCH and UL transmissions on PUSCH, where the Downlink Control Information (DCI) on PDCCH includes:

Downlink assignments containing at least modulation and coding format, resource allocation, and hybrid-ARQ information related to DL-SCH; and/or Uplink scheduling grants containing at least modulation and coding format, resource allocation, and hybrid-ARQ information related to UL-SCH.

In addition to scheduling, PDCCH can be used for

Activation and deactivation of configured PUSCH transmission with configured grant;

Activation and deactivation of PDSCH semi-persistent transmission;

Notifying one or more UEs of the slot format;

Notifying one or more UEs of the PRB(s) and OFDM symbol(s) where the UE may assume no transmission is intended for the UE 116;

Transmission of transmit power control (TPC) commands for PUCCH and PUSCH;

Transmission of one or more TPC commands for SRS transmissions by one or more UEs;

Switching a UE's active bandwidth part;

Initiating a random-access procedure;

Indicating the UE(s) to monitor the PDCCH during the next occurrence of the discontinuous reception (DRX) on-duration; and/or In integrated access and backhaul (IAB) context, indicating the availability for soft symbols of an IAB distributed units (IAB-DU).

A UE monitors a set of PDCCH candidates in the configured monitoring occasions in one or more configured COntrol REsource SETs (CORESETs) according to the corresponding search space configurations.

A CORESET includes a set of PRBs with a time duration of 1 to 3 OFDM symbols. The resource units Resource Element Groups (REGs) and Control Channel Elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DMRS. QPSK modulation is used for PDCCH.

A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

In the downlink, the gNB 102 can dynamically allocate resources to UEs via the Cell RNTI (C-RNTI) on PDCCH (s). A UE monitors the PDCCH(s) in order to find assignments when its downlink reception is enabled (activity governed by DRX when configured). When CA is configured, the same C-RNTI applies to all serving cells.

The gNB 102 may pre-empt an ongoing PDSCH transmission to one UE with a latency-critical transmission to another UE. The gNB 102 can configure UEs to monitor interrupted transmission indications using interruption RNTI (INT-RNTI) on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB 102 can allocate downlink resources for the initial HARQ transmissions to UEs. RRC defines the periodicity of the configured downlink assignments while PDCCH addressed to configured scheduling RNTI (CS-RNTI) can either signal and activate the configured downlink assignment, or deactivate it, i.e., a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell if they overlap in time. Otherwise, a downlink reception according to the configured downlink assignment is assumed, if activated.

The UE may be configured with up to 8 active configured downlink assignments for a given BWP of a serving cell. When more than one is configured:

The network 130 decides which of these configured downlink assignments are active at a time (including all of them); and Each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported:

The first PUSCH is triggered with a DCI, with subsequent PUSCH transmissions following the RRC configuration and scheduling received on the DCI; or The PUSCH is triggered by data arrival to the UE's transmit buffer and the PUSCH transmissions follow the RRC configuration.

In the uplink, the gNB 102 can dynamically allocate resources to UEs via the C-RNTI on PDCCH(s). A UE monitors the PDCCH(s) in order to find grants for uplink transmission when its downlink reception is enabled (activity governed by DRX when configured).

When CA is configured, the same C-RNTI applies to all serving cells.

The gNB 102 may cancel a PUSCH transmission, or a repetition of a PUSCH transmission, or an SRS transmission of a UE for another UE with a latency-critical transmission. The gNB 102 can configure UEs to monitor cancelled transmission indications using cancellation indication RNTI (CI-RNTI) on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB 102 can allocate uplink resources for the initial HARQ transmissions and HARQ retransmissions to UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI can either signal and activate the configured uplink grant, or deactivate it; i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell if they overlap in time. Otherwise, an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC protocol data units (PDUs) associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC PDU associated with the overlapping resource. In case the MAC PDU associated with a deprioritized transmission has already been generated, the UE keeps it stored to allow the gNB 102 to schedule a retransmission. The UE may also be configured by the gNB 102 to transmit the stored MAC PDU as a new transmission using a subsequent resource of the same configured uplink grant configuration when an explicit retransmission grant is not provided by the gNB 102.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network 130 decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When supplementary uplink (SUL) is configured, the network 130 should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signalling. The dynamically indicated number of repetitions shall override the RRC configured number of repetitions, if both are present.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

HARQ operation is supported for DL reception. Asynchronous Incremental Redundancy HARQ is supported. The gNB 102 provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a TB.

HARQ operation is supported for UL transmission. Asynchronous Incremental Redundancy HARQ is supported. The gNB 102 schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

Up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

Physical uplink control channel (PUCCH) carries the Uplink Control Information (UCI) from the UE to the gNB 102. UCI includes at least hybrid automatic request acknowledgement (HARQ-ACK) information, scheduling request (SR), and channel state information (CSI).

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells:

SCells added to the set are initially activated or deactivated; and/or

SCells which remain in the set (either unchanged or reconfigured) do not change their activation status (activated or deactivated).

At handover or connection resume from RRC_INACTIVE:

SCells are activated or deactivated.

To enable reasonable UE battery consumption when bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE 116's dedicated BWPs configured by network via dedicated RRC signalling. The SpCell and PUCCH SCell cannot be configured with a dormant BWP.

To enable fast SCell activation when CA is configured, aperiodic CSI-RS for tracking for fast SCell activation can be configured for an SCell to assist AGC and time/frequency synchronization. A MAC CE is used to trigger activation of one or more SCell(s) and trigger the aperiodic CSI-RS for tracking for fast SCell activation for a (set of) deactivated SCell(s).

The dormant BWP is one of downlink BWPs configured by the network 130 via dedicated RRC signaling. In the dormant BWP, the UE stop monitoring PDCCH on/for the SCell, but continues performing CSI measurements, Automatic Gain Control (AGC) and beam management, if configured.

If a UE detects a DCI format with SCell dormancy indication that indicates an active DL BWP change for an SCell in slot n of primary cell, the UE is not required to receive or transmit in the SCell during a time duration specified in [TS 38.133].

If the MAC entity is configured with one or more SCells, the network 130 may activate and deactivate the configured SCells. Upon configuration of an SCell, the SCell is deactivated unless the parameter sCellState is set to activated for the SCell by upper layers.

The configured SCell(s) is activated and deactivated by:

receiving the SCell Activation/Deactivation MAC CE described in clause 6.1.3.10;

receiving the Enhanced SCell Activation/Deactivation MAC CE described in clause 6.1.3.55;

configuring sCellDeactivationTimer timer per configured SCell (except the SCell configured with PUCCH, if any): the associated SCell is deactivated upon its expiry;

configuring sCellState per configured SCell: if configured, the associated SCell is activated upon SCell configuration; and/or receiving scg-State: the SCells of secondary cell group (SCG) are deactivated.

The MAC entity shall for each configured SCell:

1>if an SCell is configured with sCellState set to activated upon SCell configuration, or an SCell Activation/Deactivation MAC CE or an Enhanced SCell Activation/Deactivation MAC CE is received activating the SCell:

2>if the SCell was deactivated prior to receiving this Enhanced SCell Activation/Deactivation MAC CE and a tracking reference signal (TRS) is indicated for this SCell:

3>indicate to lower layers the information regarding the TRS.

2>if the SCell was deactivated prior to receiving this SCell Activation/Deactivation MAC CE or this Enhanced SCell Activation/Deactivation MAC CE; or 2>if the SCell is configured with sCellState set to activated upon SCell configuration:

3>iffirstActiveDownlinkBWP-Id is not set to dormant BWP:

4>activate the SCell according to the timing defined in [REF3] TS 38.213 [6] for MAC CE activation and according to the timing defined in TS 38.133 [11] for direct SCell activation; i.e., apply normal SCell operation including:

5>SRS transmissions on the SCell;

5>CSI reporting for the SCell;

5>PDCCH monitoring on the SCell;

5>PDCCH monitoring for the SCell;

5>PUCCH transmissions on the SCell, if configured.

3>else (i.e.,firstActiveDownlinkBWP-Id is set to dormant BWP):

4>stop the bwp-InactivityTimer of this Serving Cell, if running.

3>activate the DL BWP and UL BWP indicated by firstActiveDownlinkBWP-Id and firstActiveUplinkBWP-Id respectively.

2>start or restart the sCellDeactivationTimer associated with the SCell according to the timing defined in [REF3] TS 38.213 [6] for MAC CE activation and according to the timing defined in TS 38.133 [11] for direct SCell activation;

2>if the active DL BWP is not the dormant BWP:

3>(re-)initialize any suspended configured uplink grants of configured grant Type 1 associated with this SCell according to the stored configuration, if any, and to start in the symbol according to rules in clause 5.8.2;

3>trigger power headroom report (PHR) according to clause 5.4.6.

1>else if an SCell Activation/Deactivation MAC CE or an Enhanced SCell Activation/Deactivation MAC CE is received deactivating the SCell; or 1>if the sCellDeactivationTimer associated with the activated SCell expires; or 1>if the SCG associated with the activated SCell is deactivated:

2>deactivate the SCell according to the timing defined in [REF3] TS 38.213 [6];

2>stop the sCellDeactivationTimer associated with the SCell;

2>stop the bwp-InactivityTimer associated with the SCell;

2>deactivate any active BWP associated with the SCell;

2>clear any configured downlink assignment and any configured uplink grant Type 2 associated with the SCell respectively;

2>clear any PUSCH resource for semi-persistent CSI reporting associated with the SCell;

2>suspend any configured uplink grant Type 1 associated with the SCell;

2>flush all HARQ buffers associated with the SCell;

2>cancel, if any, triggered consistent listen before talk (LBT) failure for the SCell.

1>if PDCCH on the activated SCell indicates an uplink grant or downlink assignment; or 1>if PDCCH on the Serving Cell scheduling the activated SCell indicates an uplink grant or a downlink assignment for the activated SCell; or 1>if a MAC PDU is transmitted in a configured uplink grant and LBT failure indication is not received from lower layers; or 1>if a MAC PDU is received in a configured downlink assignment:

2>restart the sCellDeactivationTimer associated with the SCell.

1>if the SCell is deactivated:

2>not transmit SRS on the SCell;

2>not report CSI for the SCell;

2>not transmit on UL-SCH on the SCell;

2>not transmit on RACH on the SCell;

2>not monitor the PDCCH on the SCell;

2>not monitor the PDCCH for the SCell;

2>not transmit PUCCH on the SCell.

HARQ feedback for the MAC PDU containing SCell Activation/Deactivation MAC CE or Enhanced SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

A Serving Cell may be configured with one or multiple BWPs, and the maximum number of BWP per Serving Cell is specified in [REF3] TS 38.213 [6].

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random-Access procedure or upon detection of consistent LBT failure on SpCell. Upon RRC (re-)configuration of firstActiveDownlinkBWP-Id and/or firstActiveUpinkBWP-Id for SpCell except for PSCell when SCG is deactivated (see clause 5.29) or activation of an SCell, the DL BWP and/or UL BWP indicated byfirstActiveDownlinkBWP-Id and/or firstActiveUplinkBWP-Id respectively (as specified in [REF7] TS 38.331 [5]) is active without receiving PDCCH indicating a downlink assignment or an uplink grant. Upon RRC (re-)configuration offirstActiveDownlinkBWP-Id for PSCell when SCG is deactivated, the DL BWP is switched to the firstActiveDownlinkBWP-Id as specified in [REF7] TS 38.331 [5]. The active BWP for a Serving Cell is indicated by either RRC or PDCCH (as specified in [REF3] TS 38.213 [6]). For unpaired spectrum, a DL BWP is paired with a UL BWP, and BWP switching is common for both UL and DL.

For each SCell a dormant BWP may be configured with dormantBWP-Id by RRC signalling as described in [REF7] TS 38.331 [5]. Entering or leaving dormant BWP for SCells is done by BWP switching per SCell or per dormancy SCell group based on instruction from PDCCH (as specified in [REF3] TS 38.213 [6]). The dormancy SCell group configurations are configured by RRC signalling as described in [REF7] TS 38.331 [5]. Upon reception of the PDCCH indicating leaving dormant BWP, the DL BWP indicated by firstOutsideActiveTimeBWP-Id or by firstWithinActiveTimeBWP-Id (as specified in [REF7] TS 38.331 [5] and [REF3] TS 38.213 [6]) is activated. Upon reception of the PDCCH indicating entering dormant BWP, the DL BWP indicated by dormantBWP-Id (as specified in [REF7] TS 38.331 [5]) is activated. The dormant BWP configuration for SpCell or PUCCH SCell is not supported.

For each activated Serving Cell configured with a BWP, the MAC entity shall:

1>if a BWP is activated and the active DL BWP for the Serving Cell is not the dormant BWP and the Serving Cell is not the PSCell of deactivated SCG:
2>transmit on UL-SCH on the BWP;
2>transmit on RACH on the BWP, if PRACH occasions are configured;
2>monitor the PDCCH on the BWP;
2>transmit PUCCH on the BWP, if configured;
2>report CSI for the BWP;
2>transmit SRS on the BWP, if configured;
2>receive DL-SCH on the BWP;
2>(re-)initialize any suspended configured uplink grants of configured grant Type 1 on the active BWP according to the stored configuration, if any, and to start in the symbol according to rules in clause 5.8.2;
2>if lbt-FailureRecoveryConfig is configured:
3>stop the Ibt-FailureDetectionTimer, if running;
3>set LBT COUNTER to 0;
3>monitor LBT failure indications from lower layers as specified in clause 5.21.2.
1>if a BWP is activated and the active DL BWP for the Serving Cell is dormant BWP:
2>stop the bwp-InactivityTimer of this Serving Cell, if running.
2>not monitor the PDCCH on the BWP;
2>not monitor the PDCCH for the BWP;
2>not receive DL-SCH on the BWP;
2>not report CSI on the BWP, report CSI except aperiodic CSI for the BWP;
2>not transmit SRS on the BWP;
2>not transmit on UL-SCH on the BWP;
2>not transmit on RACH on the BWP;
2>not transmit PUCCH on the BWP;
2>clear any configured downlink assignment and any configured uplink grant Type 2 associated with the SCell respectively;
2>suspend any configured uplink grant Type 1 associated with the SCell;
2>if configured, perform beam failure detection and beam failure recovery for the SCell if beam failure is detected.
1>if a BWP is deactivated or the Serving Cell is PSCell of deactivated SCG:
2>not transmit on UL-SCH on the BWP;
2>not transmit on RACH on the BWP;
2>not monitor the PDCCH on the BWP;
2>not transmit PUCCH on the BWP;
2>not report CSI for the BWP;
2>not transmit SRS on the BWP;
2>not receive DL-SCH on the BWP;
2>clear any configured downlink assignment and configured uplink grant of configured grant Type 2 on the BWP;
2>suspend any configured uplink grant of configured grant Type 1 on the inactive BWP.

Upon initiation of the Random-Access procedure on a Serving Cell, after the selection of carrier for performing Random Access procedure as specified in clause 5.1.1, the MAC entity shall for the selected carrier of this Serving Cell:

1>if PRACH occasions are not configured for the active UL BWP:
2>if the UE is a RedCap UE; and
2>if initialUplinkBWP-RedCap is configured:
3>switch the active UL BWP to BWP indicated by initialUplinkBWP-RedCap.
2>else:
3>switch the active UL BWP to BWP indicated by initialUplinkBWP.
2>if the Serving Cell is an SpCell:
3>if the UE is a RedCap UE; and
3>if initialDowninkBWP-RedCap is configured:
4>switch the active DL BWP to BWP indicated by initialDownlinkBWP-RedCap.
3>else:
4>switch the active DL BWP to BWP indicated by initialDownlinkBWP.
1>else:
2>if the Serving Cell is an SpCell:
3>if the active DL BWP does not have the same bwp-Id as the active UL BWP:
4>switch the active DL BWP to the DL BWP with the same bwp-Id as the active UL BWP.
1>stop the bwp-InactivityTimer associated with the active DL BWP of this Serving Cell, if running.
1>if the Serving Cell is SCell:
2>stop the bwp-InactivityTimer associated with the active DL BWP of SpCell, if running.
1>perform the Random-Access procedure on the active DL BWP of SpCell and active UL BWP of this Serving Cell.

If the MAC entity receives a PDCCH for BWP switching of a Serving Cell, the MAC entity shall:

1>if there is no ongoing Random-Access procedure associated with this Serving Cell; or
1>if the ongoing Random-Access procedure associated with this Serving Cell is successfully completed upon reception of this PDCCH addressed to C-RNTI (as specified in clauses 5.1.4, 5.1.4a, and 5.1.5):
2>cancel, if any, triggered consistent LBT failure for this Serving Cell;

2>perform BWP switching to a BWP indicated by the PDCCH.

If the MAC entity receives a PDCCH for BWP switching for a Serving Cell(s) or a dormancy SCell group(s) while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion (as specified in clauses 5.1.4, 5.1.4a, and 5.1.5) in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing Random Access procedure and initiate a Random Access procedure after performing the BWP switching; if the MAC decides to ignore the PDCCH for BWP switching, the MAC entity shall continue with the ongoing Random Access procedure on the Serving Cell.

Upon reception of RRC (re-)configuration for BWP switching for a Serving Cell while a Random-Access procedure associated with that Serving Cell is ongoing in the MAC entity, the MAC entity shall stop the ongoing Random-Access procedure and initiate a Random-Access procedure after performing the BWP switching.

Upon reception of RRC (re-)configuration for BWP switching for a Serving Cell, cancel any triggered consistent LBT failure in this Serving Cell.

The MAC entity shall for each activated Serving Cell configured with bwp-InactivityTimer:

1>if the defaultDownlinkBWP-Id is configured, and the active DL BWP is not the BWP indicated by the defaultDownlinkBWP-Id, and the active DL BWP is not the BWP indicated by the dormantBWP-Id if configured; or 1>if the UE is not a RedCap UE, and if the defaultDownlinkBWP-Id is not configured, and the active DL BWP is not the initialDownlinkBWP, and the active DL BWP is not the BWP indicated by the dormantBWP-Id if configured; or 1>if the UE is a RedCap UE, and if the defaultDownlinkBWP-Id is not configured, and initialDownlinkBWP-RedCap is not configured, and the active DL BWP is not the initialDownlinkBWP; or 1>if the UE is a RedCap UE, and if the defaultDownlinkBWP-Id is not configured, and initialDownlinkBWP-RedCap is configured, and the active DL BWP is not the initialDownlinkBWP-RedCap:

2>if a PDCCH addressed to C-RNTI or CS-RNTI indicating downlink assignment or uplink grant is received on the active BWP; or 2>if a PDCCH addressed to group RNTI (G-RNTI) (G-RNTI) or group Configured Scheduling RNTI (G-CS-RNTI) configured for multicast indicating downlink assignment is received on the active BWP; or 2>if a PDCCH addressed to C-RNTI or CS-RNTI indicating downlink assignment or uplink grant is received for the active BWP; or 2>if a MAC PDU is transmitted in a configured uplink grant and LBT failure indication is not received from lower layers; or 2>if a MAC PDU is received in a configured downlink assignment for unicast or Multicast and broadcast services (MBS) multicast:

3>if there is no ongoing Random-Access procedure associated with this Serving Cell; or 3>if the ongoing Random-Access procedure associated with this Serving Cell is successfully completed upon reception of this PDCCH addressed to C-RNTI (as specified in clauses 5.1.4, 5.1.4a and 5.1.5):

4>start or restart the bwp-InactivityTimer associated with the active DL BWP.

2>if the bwp-Inactivity Timer associated with the active DL BWP expires:

3>if the defaultDownlinkBWP-Id is configured:

4>perform BWP switching to a BWP indicated by the defaultDownlinkBWP-Id.

3>else:

4>if the UE is a RedCap UE; and

4>if initialDownlinkBWP-RedCap is configured:

5>perform BWP switching to the initialDownlinkBWP-RedCap.

4>else:

5>perform BWP switching to the initialDownlinkBWP.

Note that if a Random-Access procedure is initiated on an SCell, both this SCell and the SpCell are associated with this Random-Access procedure.

1>if a PDCCH for BWP switching is received, and the MAC entity switches the active DL BWP:

2>if the defaultDownlinkBWP-Id is configured, and the MAC entity switches to the DL BWP which is not indicated by the defaultDownlinkBWP-Id and is not indicated by the dormantBWP-Id if configured; or 2>if the UE is not a RedCap UE, and if the defaultDownlinkBWP-Id is not configured, and the MAC entity switches to the DL BWP which is not the initialDownlinkBWP and is not indicated by the dormantBWP-Id if configured; or 2>if the UE is a RedCap UE, and if the defaultDownlinkBWP-Id is not configured, and initialDownlinkBWP-RedCap is not configured, and the MAC entity switches to the DL BWP which is not the initialDownlinkBWP; or 2>if the UE is a RedCap UE, and if the defaultDownlinkBWP-Id is not configured, and initialDownlinkBWP-RedCap is configured, and the MAC entity switches to the DL BWP which is not the initialDownlinkBWP-RedCap:

3>start or restart the bwp-InactivityTimer associated with the active DL BWP.

Upon initiation of the Random-Access procedure, after selection of the carrier for performing Random Access procedure as specified in clause 5.1.1, if the UE is a RedCap UE in RRC_IDLE or RRC_INACTIVE mode, the MAC entity shall:

1>if initialUplinkBWP-RedCap is configured for the selected carrier:

2>perform the Random-Access procedure as specified in clause 5.1 by using the BWP configured by initialUplinkBWP-RedCap.

1>else:

2>perform the Random-Access procedure as specified in clause 5.1 by using the BWP configured by initialUplinkBWP.

1>if initialDownlinkBWP-RedCap is configured:

2>if the Random-Access procedure was initiated for SI request (as specified in [REF7] TS 38.331 [5]) and the Random-Access Resources for SI request have been explicitly provided by RRC, and if the selected carrier is SUL carrier:

3>monitor the PDCCH on the BWP configured by initialDownlinkBWP.

2>else:

3>monitor the PDCCH on the BWP configured by initialDownlinkBWP-RedCap.

1>else:

2>monitor the PDCCH on the BWP configured by initialDownlinkBWP.

A UE configured with DRX mode operation [11, [REF6] TS 38.321] can be provided the following for detection of a DCI format 2_6 in a PDCCH reception on the PCell or on the SpCell [12, REF[7] TS 38.331].

a PS-RNTI for DCI format 2_6 by ps-RNTI a number of search space sets, by dci-Format2-6, to monitor PDCCH for detection of DCI format 2_6 on the active DL BWP of the PCell or of the SpCell according to a common search space as described in clause 10.1 a payload size for DCI format 2_6 by sizeDCI-2-6 a location in DCI format 2_6 of a Wake-up indication bit by ps-PositionDCI-2-6 a ‘0’ value for the Wake-up indication bit, when reported to higher layers, indicates to not start the drx-onDurationTimer for the next long DRX cycle [11, [REF6] TS 38.321]

a ‘1’ value for the Wake-up indication bit, when reported to higher layers, indicates to start the drx-onDurationTimer for the next long DRX cycle [11, [REF6] TS 38.321]

a bitmap, when the UE is provided a number of groups of configured SCells by dormancyGroupOutsideActiveTime, where:

the bitmap location is immediately after the Wake-up indication bit location the bitmap size is equal to the number of groups of configured SCells where each bit of the bitmap corresponds to a group of configured SCells from the number of groups of configured SCells a ‘0’ value for a bit of the bitmap indicates an active DL BWP, provided by dormantBWP-Id, for the UE [11, [REF6] TS 38.321] for each activated SCell in the corresponding group of configured SCells a ‘1’ value for a bit of the bitmap indicates:

an active DL BWP, provided by firstOutsideActiveTimeBWP-Id, for the UE for each activated SCell in the corresponding group of configured SCells, if a current active DL BWP is the dormant DL BWP a current active DL BWP, for the UE for each activated SCell in the corresponding group of configured SCells, if the current active DL BWP is not the dormant DL BWP the UE sets the active DL BWP to the indicated active DL BWP an offset by ps-Offset indicating a time, where the UE starts monitoring PDCCH for detection of DCI format 2_6 according to the number of search space sets, prior to a slot where the drx-onDurationTimer would start on the PCell or on the SpCell [11, [REF6] TS 38.321]

for each search space set, the PDCCH monitoring occasions are the ones in the first $T_s$ slots indicated by duration, or $T_s$=1 slot if duration is not provided, starting from the first slot of the first $T_s$ slots and ending prior to the start of drx-onDurationTimer.

On PDCCH monitoring occasions associated with a same long DRX Cycle, a UE does not expect to detect more than one DCI format 2_6 with different values of the Wake-up indication bit for the UE or with different values of the bitmap for the UE 116.

The UE does not monitor PDCCH for detecting DCI format 2_6 during Active Time [11, [REF6] TS 38.321].

If a UE reports for an active DL BWP a MinTimeGap value that is X slots prior to the beginning of a slot where the UE would start the drx-onDurationTimer, the ULE is not required to monitor PDCCH for detection of DCI format 2_6 during the X slots, where X corresponds to the MinTimeGap value of the SCS of the active DL BWP in Table 1.

TABLE 1

| | Minimum Time Gap X (slots) | |
|---|---|---|
| SCS (kHz) | Value 1 | Value 2 |
| 15 | 1 | 3 |
| 30 | 1 | 6 |
| 60 | 1 | 12 |
| 120 | 2 | 24 |
| 480 | 8 | 96 |
| 960 | 16 | 192 |

If a UE is provided search space sets to monitor PDCCH for detection of DCI format 2_6 in the active DL BWP of the PCell or of the SpCell and the UE detects DCI format 2_6, the physical layer of a UE reports the value of the Wake-up indication bit for the UE to higher layers [REF6] [TS 38.321] for the next long DRX cycle.

If a UE is provided search space sets to monitor PDCCH for detection of DCI format 2_6 in the active DL BWP of the PCell or of the SpCell and the UE does not detect DCI format 2_6, the physical layer of the UE does not report a value of the Wake-up indication bit to higher layers for the next long DRX cycle.

If a UE is provided search space sets to monitor PDCCH for detection of DCI format 2_6 in the active DL BWP of the PCell or of the SpCell and the UE is not required to monitor PDCCH for detection of DCI format 2_6, as described in clauses 10, 11.1, 12 of [REF3] [TS 38.213], and in clause 5.7 of [REF6] [TS 38.321] for all corresponding PDCCH monitoring occasions outside Active Time prior to a next long DRX cycle; or does not have any PDCCH monitoring occasions for detection of DCI format 2_6 outside Active Time of a next long DRX cycle the physical layer of the UE reports a value of 1 for the Wake-up indication bit to higher layers for the next long DRX cycle.

If a UE is provided search space sets to monitor PDCCH for detection of DCI format 0_1 and DCI format 1_1 and if one or both of DCI format 0_1 and DCI format 1_1 include a SCell dormancy indication field:

the SCell dormancy indication field is a bitmap with size equal to a number of groups of configured SCells, provided by dormancyGroupWithinActiveTime.

each bit of the bitmap corresponds to a group of configured SCells from the number of groups of configured Scells.

if the UE detects a DCI format 0_1 or a DCI format 1_1 that does not include a carrier indicator field, or detects a DCI format 0_1 or DCI format 1_1 that includes a carrier indicator field with value equal to 0, and if the DCI format 0_1 does not indicate UL grant Type 2 release nor deactivate semi-persistent CSI report(s) on PUSCH, or if the DCI format 1_1 does not indicate SPS PDSCH release:

a '0' value for a bit of the bitmap indicates an active DL BWP, provided by dormantBWP-Id, for the UE for each activated SCell in the corresponding group of configured Scells.

a '1' value for a bit of the bitmap indicates:

an active DL BWP, provided by firstWithinActiveTimeBWP-Id, for the UE for each activated SCell in the corresponding group of configured SCells, if a current active DL BWP is the dormant DL BWP.

a current active DL BWP, for the UE for each activated SCell in the corresponding group of configured SCells, if the current active DL BWP is not the dormant DL BWP.

the UE sets the active DL BWP to the indicated active DL BWP.

If a UE is provided search space sets to monitor PDCCH for detection of DCI format 1_1, and if the CRC of DCI format 1_1 is scrambled by a C-RNTI or a modulation and coding scheme-cell radio network temporary identifier (MCS-C-RNTI); and if a one-shot HARQ-ACK request field is not present or has a '0' value; and if the UE detects a DCI format 1_1 on the primary cell that does not include a carrier indicator field, or detects a DCI format 1_1 on the primary cell that includes a carrier indicator field with value equal to 0; and if resourceAllocation=resourceAllocationType0 and all bits of the frequency domain resource assignment field in DCI format 1_1 are equal to 0; or resourceAllocation=resourceAllocationType1 and all bits of the frequency domain resource assignment field in DCI format 1_1 are equal to 1; or resourceAllocation=dynamicSwitch and all bits of the frequency domain resource assignment field in DCI format 1_1 are equal to 0 or 1 the UE evaluates the DCI format 1_1 as indicating SCell dormancy, not scheduling a PDSCH reception, and for transport block 1 interprets the sequence of fields of:

modulation and coding scheme
new data indicator
redundancy version and of:

HARQ process number
antenna port(s)
DMRS sequence initialization as providing a bitmap to each configured SCell, in an ascending order of the SCell index, where a '0' value for a bit of the bitmap indicates an active DL BWP, provided by dormantBWP-Id, for the UE for a corresponding activated Scell;

a '1' value for a bit of the bitmap indicates:

an active DL BWP, provided by firstWithinActiveTimeBWP-Id, for the UE for a corresponding activated SCell, if a current active DL BWP is the dormant DL BWP;

a current active DL BWP, for the UE for a corresponding activated SCell, if the current active DL BWP is not the dormant DL BWP; and/or the UE sets the active DL BWP to the indicated active DL BWP.

If an active DL BWP provided by dormantBWP-Id for a UE on an activated SCell is not a default DL BWP for the UE on the activated SCell, as described in clause 12, the BWP inactivity timer is not used for transitioning from the active DL BWP provided by dormantBWP-Id to the default DL BWP on the activated SCell.

A UE is expected to provide HARQ-ACK information in response to a detection of a DCI format 1_1 indicating SCell dormancy after N symbols from the last symbol of a PDCCH providing the DCI format 1_1. If processingType2Enabled of PDSCH-ServingCellConfig is set to enable for the serving cell with the PDCCH providing the DCI format 1_1, N=7 for $\mu$=0, N=7.5 for $\mu$=1, and N=15 for $\mu$=2; otherwise, N=14 for $\mu$=0, N=16 for $\mu$=1, N=27 for $\mu$=2, N=31 for $\mu$=3, N=124 for $\mu$=5, and =248 for $\mu$=6, where y is the smallest SCS configuration between the SCS configuration of the PDCCH providing the DCI format 1_1 and the SCS configuration of a PUCCH with the HARQ-ACK information in response to the detection of the DCI format 1_1.

If a UE detects a DCI format 1_1 indicating:

SCell dormancy without scheduling a PDSCH reception, as described in clause 10.3 of [REF3] [TS 38. 213 v 17.4.0]; and is provided pdsch-HARQ-ACK-Codebook dynamic or pdsch-HARQ-ACK-Codebook-r16 the UE generates a HARQ-ACK information bit as described in clause 9.1.3 of [REF3] [TS 38.213 v 17.4.0] for a DCI format 1-1 indicating SCell dormancy, and the HARQ-ACK information bit value is ACK.

For DCI format 01, the SCell dormancy indication field includes 0 bit if higher layer parameter dormancyGroupWithinActiveTime is not configured; otherwise 1, 2, 3, 4 or 5 bits bitmap determined according to the number of different DormancyGroupID(s) provided by higher layer parameter dormancyGroupWithinActiveTime, where each bit corresponds to one of the SCell group(s) configured by higher layers parameter dormancyGroupWithinActiveTime, with most significant bit (MSB) to least significant bit (LSB) of the bitmap corresponding to the first to last configured SCell group in ascending order of DormancyGroupID. The field is only present when this format is carried by PDCCH on the primary cell within DRX Active Time and the UE is configured with at least two DL BWPs for an SCell.

For DCI format 1_1, the SCell dormancy indication includes 0 bit if higher layer parameter dormancyGroupWithinActiveTime is not configured; otherwise 1, 2, 3, 4 or 5 bits bitmap determined according to the number of different DormancyGroupID(s) provided by higher layer parameter dormancyGroupWithinActiveTime, where each bit corresponds to one of the SCell group(s) configured by higher layers parameter dormancyGroupWithinActiveTime, with MSB to LSB of the bitmap corresponding to the first to last configured SCell group in ascending order of DormancyGroupID. The field is only present when this format is carried by PDCCH on the primary cell within DRX Active Time and the UE is configured with at least two DL BWPs for an SCell.

If one-shot HARQ-ACK request is not present or set to '0', and all bits of frequency domain resource assignment are set to 0 for resource allocation type 0 or set to 1 for resource allocation type 1 or set to 0 or 1 for dynamic switch resource allocation type, this field is reserved and the following fields among the fields above are used for SCell dormancy indication, where each bit corresponds to one of the configured SCell(s), with MSB to LSB of the following fields concatenated in the order below corresponding to the SCell with lowest to highest SCell index Modulation and coding scheme of transport block 1
New data indicator of transport block 1
Redundancy version of transport block 1
HARQ process number
Antenna port(s)
DMRS sequence initialization Various embodiments are described in terms of multiple PDSCHs or multiple PUSCHs that are jointly scheduled on multiple serving cells, such as a subset/set of cells from among one or more sets of co-scheduled cells.

The embodiments are generic and can apply to various other scenarios such as when a UE is jointly scheduled to receive/transmit multiple PDSCHs/PUSCHs:

from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; or in multiple time units, such as multiple slots or multiple transmission time intervals (TTIs); or on multiple BWPs associated with one or more cells/carriers/TRPs, including multiple BWPs of a single serving cell/carrier for a UE with a capability of reception/transmission on multiple active BWPs; or on one or more TRPs/cells, wherein the UE can receive/transmit more than one PDSCH/PUSCH on each co-scheduled TRP/cell; or for multiple transport blocks (TBs), or for multiple code-words (CWs) corresponding to single TB or multiple TBs; or for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs", or "co-scheduled slots/TTIs", or "co-scheduled BWPs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments evaluate reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

In various embodiments, the phrase "a UE configured with multi-cell scheduling" refers to a UE that is configured joint scheduling for at least one set of co-scheduled cells.

In various embodiments, the phrase "scheduled PDSCH" refers to a PDSCH that is scheduled/indicated by a DCI format, regardless of whether the PDSCH is received or not yet.

A UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described in one or more embodiments. Additionally, the UE can be indicated via a DCI format in a PDCCH, or via a MAC CE in a PDSCH, a subset of a set of co-scheduled cells, wherein cells of the subset can change across different PDCCH monitoring occasions, for example, as indicated by a corresponding DCI format.

In one example, multi-cell scheduling can also include operations related to DL/UL transmissions such as reporting HARQ-ACK information, beam/CSI measurement or reporting, transmission or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE can receive a DCI format for scheduling multiple co-scheduled cells on a first scheduling cell in a first PDCCH monitoring occasion, or on a second scheduling cell in a second PDCCH monitoring occasion. The DCI format can be associated with any search space set or can be restricted to be associated with UE-specific search space (USS) sets. For example, the DCI format can be associated with multicast scheduling and have CRC scrambled by a G-RNTI and PDCCH candidates monitored according to common search space (CSS) sets or can be associated with unicast scheduling and have CRC scrambled by a C-RNTI and PDCCH candidates monitored according to USS sets. Such PDCCH monitoring from two scheduling cells can be simultaneous, for example in a same span of symbol or in a same slot, or can be non-overlapping, such as in different slots (per higher layer configuration, or per indication in a PDCCH or via a MAC CE). The UE may or may not expect that both the first scheduling cell and the second scheduling cell can schedule, through PDCCH transmissions in a same time interval such as a span or a slot, transmissions or receptions on a same cell. The UE can also monitor PDCCH for detection of a DCI format providing scheduling only on one cell from the set of co-scheduled cells (single-cell scheduling DCI format).

A UE can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB 102. In one example, that capability can depend on an operating frequency band or on a frequency range such as above or below 6 GHz.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

A UE can also be configured a number of cells that do not belong to any of set of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set:

- have a same numerology (SCS configuration and CP); or
- have a same numerology for respective active DL/UL BWPs; or
- have a same duplex configuration, for example, all cells have frequency division duplexing (FDD) configuration, or all cells have time division duplexing (TDD) configuration and, in case of a TDD configuration, also have a same UL-DL configuration; or
- are within a same frequency band (intra-band CA).

A serving cell can belong only to a single set of co-scheduled cells so that the sets of co-scheduled cells do not include any common cell or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling. The UE may not monitor PDCCH according to respective search space sets until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods, such as those described in one or more embodiments herein, for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells.

In a first example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells.

In a second example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells.

In a third example, a DCI format for multi-cell scheduling provides a number of co-scheduled cells, and the indexes of the co-scheduled cells are provided by additional methods, such as by an additional DCI format (or an additional part/stage of a same DCI format) or by higher layer signaling as described in one or more embodiments herein.

In a fourth example, a CIF field in a DCI format for multi-cell scheduling can be a bitmap mapping to the individual cells or subsets of cells from the set of co-scheduled cells. When the DCI format is applicable to all cells in the set of co-scheduled cells, the DCI format may not include a CIF.

In a third option for the second approach, a UE can implicitly determine indexes for co-scheduled cells without need for explicit gNB indication. For example, the UE can determine indexes for co-scheduled cells based on a PDCCH monitoring parameter, such as:

- a CORESET index; or
- a search space set index, or a carrier indicator parameter n_CI corresponding to the search space set index; or
- a set of CCEs in the search space set or a first/last CCE in the search space set;

where the UE received a PDCCH providing the DCI format for multi-cell scheduling.

According to the third option, the UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

Receptions or transmissions on a respective subset of cells that are jointly scheduled by a single DCI format, or by using complementary methods such as those described in one or more embodiments herein, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation or based on higher layer configuration. For some cell-specific scheduling information parameters, the UE can be provided differential values compared to a reference value wherein the reference value can correspond, for example, to a first scheduled cell from a set of scheduled cells.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary methods.

The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets.

For a UE that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

In a first approach, referred to as concatenated DCI format for multi-cell scheduling, a DCI format for multi-cell scheduling can provide separate values of fields for each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission.

In a second approach, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be an MCS field wherein a value indicated in the DCI format can be for a PDSCH reception on a first cell and a value for a PDSCH reception on a second cell can be determined from the first value and a configured offset value. This approach can be beneficial, for example, for co-scheduling cells that have several similar physical channel characteristics or configurations, such as for intra-band CA operation.

In a third approach, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

In a first option for the third approach, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

In a second option for the third approach, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

In the second option, physical layer processing of M-DCI(s) that are included in the first PDSCH can be same as that for a DCI in a PDCCH, such as for the DCI scheduling the first PDSCH, or can be same as that for data information/transport block in the first PDSCH. For example, physical layer processing refers to, for example, modulation, coding, scrambling, and so on. In addition, the UE can determine a number of coded modulation symbols corresponding to multi-scheduling information, such as M-DCIs, that are multiplexed in a first PDSCH scheduled by a single-cell scheduling DCI format, based on a scaling factor $$\beta_{offset}^{PDSCH} = \beta_{offset}^{M-DCI}$$

applied to a total (coded) payload size for the M-DCIs. Such scaling factor determines an effective channel coding rate of M-DCIs multiplexed on the first PDSCH, for flexible link adaptation and improved reliability of the M-DCIs according to physical channel conditions.

In a fourth approach, referred to as multi-stage PDCCHs/DCIs for multi-cell scheduling, a UE can be provided information for multi-cell scheduling of multiple PDSCHs/PDCCHs on multiple respective cells using a multi-stage DCI method, such as a 2-stage DCI wherein a first-stage DCI format includes a set of cell-common fields, and a second-stage DCI format includes cell-specific fields. The UE receives the first-stage DCI format in a first PDCCH and the second-stage DCI format in a second PDCCH. This approach can be beneficial, for example, for co-scheduling several cells that have several common physical characteristics, such as a time-domain resource allocation or a frequency-domain resource allocation, without incurring latency and without having a DCI format size that is too large (that would result if the first-stage and second-stage DCI formats were combined into a single DCI format) for receiving cell-specific parameters when the second PDCCH is received in a same slot as the first PDCCH. The first-stage DCI format can also indicate a location for a PDCCH providing the second-stage DCI format, such as a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORESET, search space, CCEs, or monitoring occasions in which the UE receives the first and the second linked PDCCHs.

The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a field in the DCI format, or by a dedicated CORESET and associated search space sets. There can be two cases for monitoring a DCI format for multi-cell scheduling: a first case based on search space set(s) dedicated to multi-cell scheduling, and a second case based on search space set(s) shared by both single-cell scheduling and multi-cells scheduling.

In a first case, a search space set for multi-cell scheduling is associated only with DCI format(s) for multi-cell scheduling on a set of co-scheduled cells. Such search space sets can correspond to a set-level n_CI value, which can be separate from n_CI values corresponding to search space sets for single-cell scheduling. By monitoring the search space set, the UE can detect a DCI format for scheduling on all scheduled cells or only a subset of scheduled cells from the set of co-scheduled cells. Accordingly, the detected DCI format can include a CIF value that is same as or different from an n_CI value corresponding to the search space set for multi-cell scheduling. The search space set can be commonly configured, thereby linked, on the scheduling cell and on all scheduled cells from the set of co-scheduled cells. The UE can monitor the search space set for multi-cell scheduling when linked search spaces sets on the scheduling cell and at least one scheduled cell from the set co-scheduled cells is configured on corresponding active DL BWPs of the scheduling cell and the at least one scheduled cell.

In a second case, a search space set for multi-cell scheduling is associated with DCI format(s) both for multi-cell scheduling on a set of co-scheduled cells and for single-cell scheduling on a first scheduled cell from the set of co-scheduled cells. Such search space sets correspond to an existing cell-level n_CI value corresponding to the first scheduled cell. By monitoring the search space set, the UE can detect a DCI format for single-cell scheduling on the first scheduled cell with a CIF value that is same as the n_CI value corresponding to the first scheduled cell, or can detect a DCI format for multi-cell scheduling on all scheduled cells or only a subset of scheduled cells from the set of co-scheduled cells, with a set-level CIF value that is different from the n_CI value corresponding to the first scheduled cell. The search space set is commonly configured, thereby linked, on the scheduling cell and only the first scheduled cell, and the UE monitors the linked search space sets when both are configured on active DL BWPs of the scheduling cell and the first scheduled cell.

In one example, a UE can be configured multiple sets of cells for multi-cell scheduling of PDSCHs/PUSCHs by a DCI format 0_3/1_3. For example, each set of cells, from the multiple sets of cells, can include one or more cells. For example, the UE expects that different sets of cells are mutually exclusive, so a cell in a first set of cells cannot be included in a second set of cells. In another example, the UE can be configured two sets of cells that include a same cell. For example, the latter example can be conditioned to occur (only) when the two sets of cells include a same number of cells or correspond to a same maximum number of TBs across different cells or across different cell combinations configured for the set of cells.

For example, the UE can report a capability for a maximum number of sets of cells for multi-cell scheduling. For example, different sets of cells for multi-cell scheduling can correspond to same or different scheduling cell. In one example, each set of cells corresponds to a different scheduling cells, so the UE is configured a single set of cells for each scheduling cell. The latter example can be based on a UE capability that does not support multiple sets of cells for a same scheduling cell. In one example, the UE can be configured a scheduling cell that corresponds to more than one sets of cells. The latter example can be based on a UE capability that supports multiple sets of cells for a same scheduling cell. For example, the UE can report a maximum number of sets of cells that can correspond to each/any scheduling cell.

In one example, when a UE is configured first and second sets of cells for multi-cell scheduling from a same scheduling cell, mixture scheduling among different sets of cells is not supported. For example, a DCI format 0_3/1_3 can schedule PUSCHs/PDSCHs on cells from (only) one set of cells, wherein the UE can determine the one set of cells, for example, based on a cell set indicator field (CSIF or SIF for short) in the DCI format 1_3/0_3. A bit-width of the CSIF is ceil(log 2(N_set)), wherein N_set is a number of sets of cells for multi-cell scheduling associated with a same scheduling cell. For example, a first DCI format 0_3/1_3 can schedule first PUSCHs/PUSCHs on first cells (only) from a first set of cells, and a second DCI format 0_3/1_3 can schedule second PUSCHs/PUSCHs on second cells (only) from a second set of cells. In another example, mixture scheduling among different sets of cells may be supported, for example, subject to UE capability. For example, a DCI format 0_3/1_3 can schedule both first PUSCHs/PDSCHs on first cells from a first set of cells and second PUSCHs/PDSCHs on second cells from a second set of cells. For example, the DCI format 0_3/1_3 can include two CSIF values with a first CSIF value indicating the first set of cells and a second CSIF value indicating the second set of cells.

In one example, when the UE is configured only a single set of cells associated with a scheduling cell, N set=0, a CSIF is not present in the DCI forma 0_3/1_3, and the UE can determine that any DCI format 0_3/1_3 provided by a PDCCH on the scheduling cell corresponds to the single set of cells.

For example, a DCI format 0_3/1_3 can schedule any cell combination (that is, any subset of cells), from a set of cells, and the UE can determine a co-scheduled cell combination based on, for example, a cell-specific field in DCI format 0_3/1_3, such as an FDRA field, that provides separate values for each cell in the set of cells. For example, a DCI format can schedule only cell combinations (that is, only subset of cells), from a set of cells, that is provided by higher layers for the set for the set of cells. For example, the UE can be configured, for the set of cells, a table/list of cell combinations along with corresponding IDs for the respective cell combinations, and a co-scheduled cell combination indicator field in the DCI format 0_3/1_3 indicates a cell combination for scheduling PUSCHs/PDSCHs by providing an ID corresponding to the cell combination. For example, the co-scheduled cell combination indicator field includes ceiling(log 2(N_cell_combo,s)), wherein N_cell_combo,s is a number of configured cell combinations (or a number of corresponding IDs) for a set of cells with set index s. For example, the UE can be configured separate table/list of cell combinations for DCI format 0_3 for scheduling PUSCHs, and for DCI format 1_3 for scheduling PDSCHs. For example, a first set of cells can be configured for DCI format 1_3, and no DCI format 0_3 applies to the set of cells. For example, a second set of cells can be configured for DCI format 0_3, and no DCI format 1_3 applies to the set of cells. For example, a set of cells can be configured both DCI format 0_3 and DCI format 1_3. For example, the UE expects that all sets of cells can be configured both DCI format 0_3 and 1_3.

For example, the UE determines a size of DCI format 0_3 separately for each set of cells for multi-cell scheduling. For example, the UE can determine a first size for a first DCI format 0_3 scheduling PUSCHs on cells from a first set of cells, and a second size for a second DCI format 0_3 scheduling PUSCHs on cells from a second set of cells.

For example, the UE determines a size of DCI format 1_3 separately for each set of cells for multi-cell scheduling. For example, the UE can determine a first size for a first DCI format 1_3 scheduling PDSCHs on cells from a first set of cells, and a second size for a second DCI format 1_3 scheduling PDSCHs on cells from a second set of cells.

In one example, the UE counts sizes of DCI formats 0_3 and 1_3 corresponding to a set of cells towards a DCI size budget (referred to as, the "3+1" rule) for a reference cell from the set of cells. For example, the reference for the set of cells cell can be the scheduling cell when the scheduling cell is included in the set of cells and search space sets of the DCI format 0_X/1_X is configured only on the scheduling cell. For example, when the search space sets of the DCI format 0_X/1_X are configured on a cell from the set of cells, in addition to the scheduling cell, the reference cell can be the cell on which (linked) search space sets of DCI format 0_X/1_X are configured and are associated with the search space sets of the scheduling cell with the same search space IDs. For example, when the scheduling cell is not included in a set of cells, the UE expects to be configured (linked) search space sets of DCI format 0_X/1_X on (only) one cell from the set of cells.

In one example, the UE can determine a first size for a DCI format 0_3 and a second size for a DCI format 1_3, with the first size different from the second size, when both DCI formats 0_3 and 1_3 correspond to a same set of cells. In one example, the UE applies size alignment between DCI formats 0_3 and 1_3 corresponding to a same set of cells when the DCI size budget ("3+1") on a reference cell is exceeded after applying DCI size alignment to all single-cell scheduling DCI formats.

In one example, different sets of cells for multi-cell scheduling can correspond to one or more of the following:

- separate n_CI values, wherein an n_CI value for the set of cells is same as a value provided as the cell set indicator field (CSIF or SIF) in the DCI format 0_3/1_3; When multiple sets of cells correspond to a same scheduling cell, the UE expects unique/different n_CI values (equivalently, unique/different CSI values) for each set of cells;
- separate search space sets (for example, USS sets) for monitoring one or both of DCI formats 0_3/1_3; and/or
- separate reference cells for counting DCI format sizes for DCI formats 0_3/1_3, or for counting a number of PDCCH candidates or non-overlapping CCEs corresponding to (search space sets for monitoring) DCI formats 0_3/1_3.

In one example, when a UE is configured multiple set of cells for multi-cell scheduling from a same or different scheduling cells, the UE can monitor a first PDCCH in a first monitoring occasion (MO) for detection of a first DCI format for multi-cell scheduling and can monitor a second PDCCH in the same MO for detection of a second DCI format for multi-cell scheduling, wherein the first and the second DCI formats correspond to cells from same or different sets of cells.

In one example, the UE can receive first and second PDCCHs on first and second scheduling cells in a same PDCCH monitoring occasion (MO), providing first and second DCI formats for multi-cell scheduling, such as first and second DCI formats 1_3, that schedule first PDSHCs and second PDSCHs on first cells from a first set of cells and second cells from a second set of cells, respectively, such that:

- in a first example, the first set and the second set of cells are separate (the corresponding scheduling cells can be same or different); or
- in a second example, the first set and the second set of cells are the same (so the corresponding scheduling cell is the same), and the first cells and the second cells are separate; or
- in a third example, the first set and the second set of cells are the same (so the corresponding scheduling cell is the same), and the first cells and the second cells share at least one cell.

At least the second and third examples can be based on corresponding UE capabilities.

In various embodiment, a DCI indicating SCell dormancy refers to a DCI format that indicates dormancy or non-dormancy for cells or groups of cell that are configured by RRC or indicated by the DCI format, such as switching a cell from dormant BWP to non-dormant BWP, or vice versa.

Figure 6:
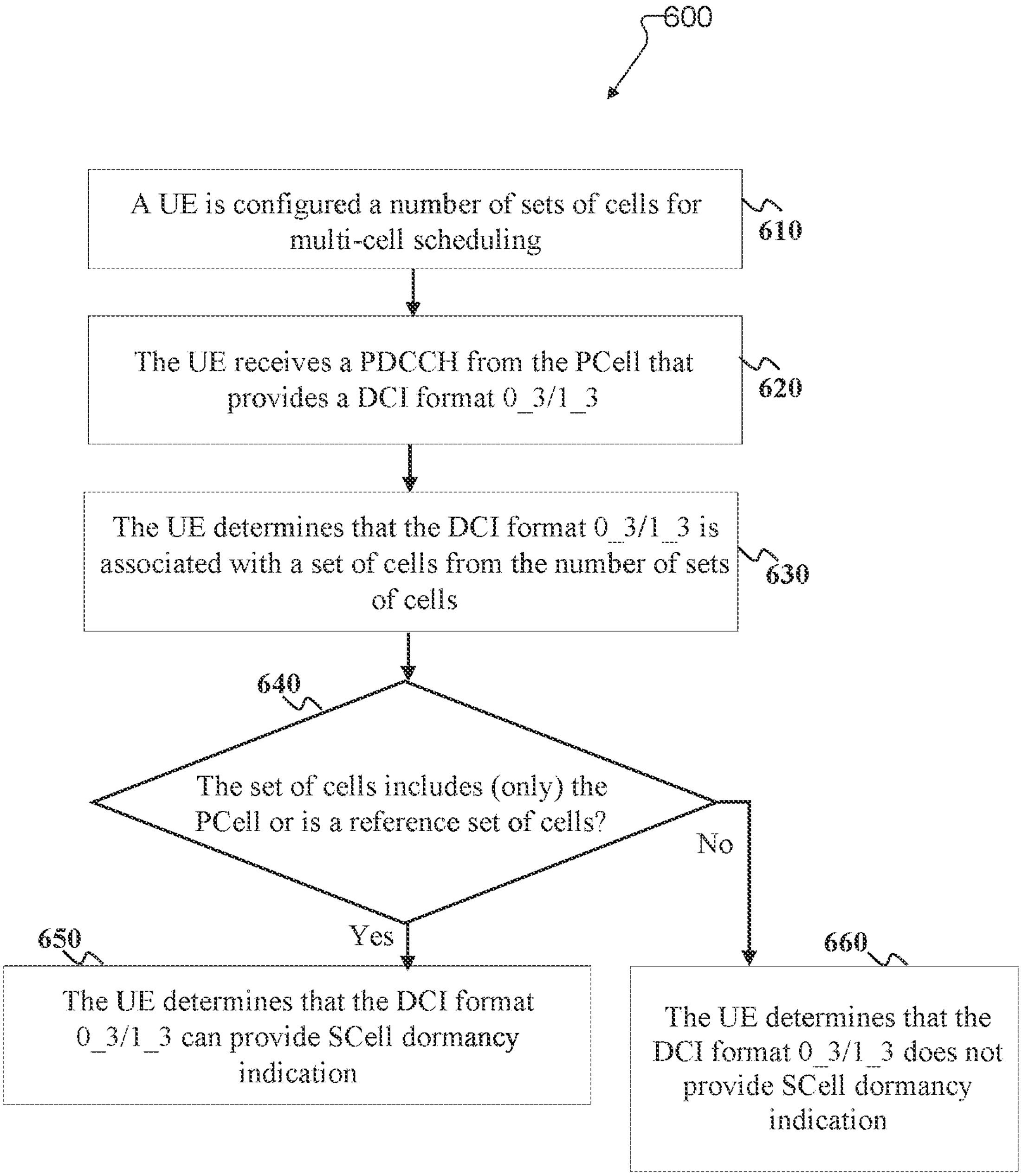
FIG. 6 illustrates a flowchart of an example UE procedure for determination of a downlink control information (DCI) format providing a secondary cell (SCell) dormancy indication according to embodiments of the present disclosure.

FIG. 6 illustrates a flowchart of an example UE procedure 600 for determination of a DCI format providing a SCell dormancy indication according to embodiments of the present disclosure. For example, procedure 600 for determination of a DCI format providing a SCell dormancy indication can be performed by any of the UEs 111-116 of FIG. 1. This example is for illustration only and other embodiments can be used without departing from the scope of the present disclosure.

The procedure begins in 610, a UE is configured a number of sets of cells for multi-cell scheduling. In 620, the UE receives a PDCCH from the PCell that provides a DCI format 0_3/1_3. In 630, the UE determines that the DCI format 0_3/1_3 is associated with a set of cells from the number of sets of cells. In 640, the UE determines whether the set of cells includes (only) the PCell or is a reference set of cells. In 650, when the UE determines that the set of cells includes (only) the PCell or is the reference set of cells, the UE determines that the DCI format 0_3/1_3 can provide SCell dormancy indication; Otherwise, in 660, the UE determines that the DCI format 0_3/1_3 does not provide SCell dormancy indication.

Figure 7:
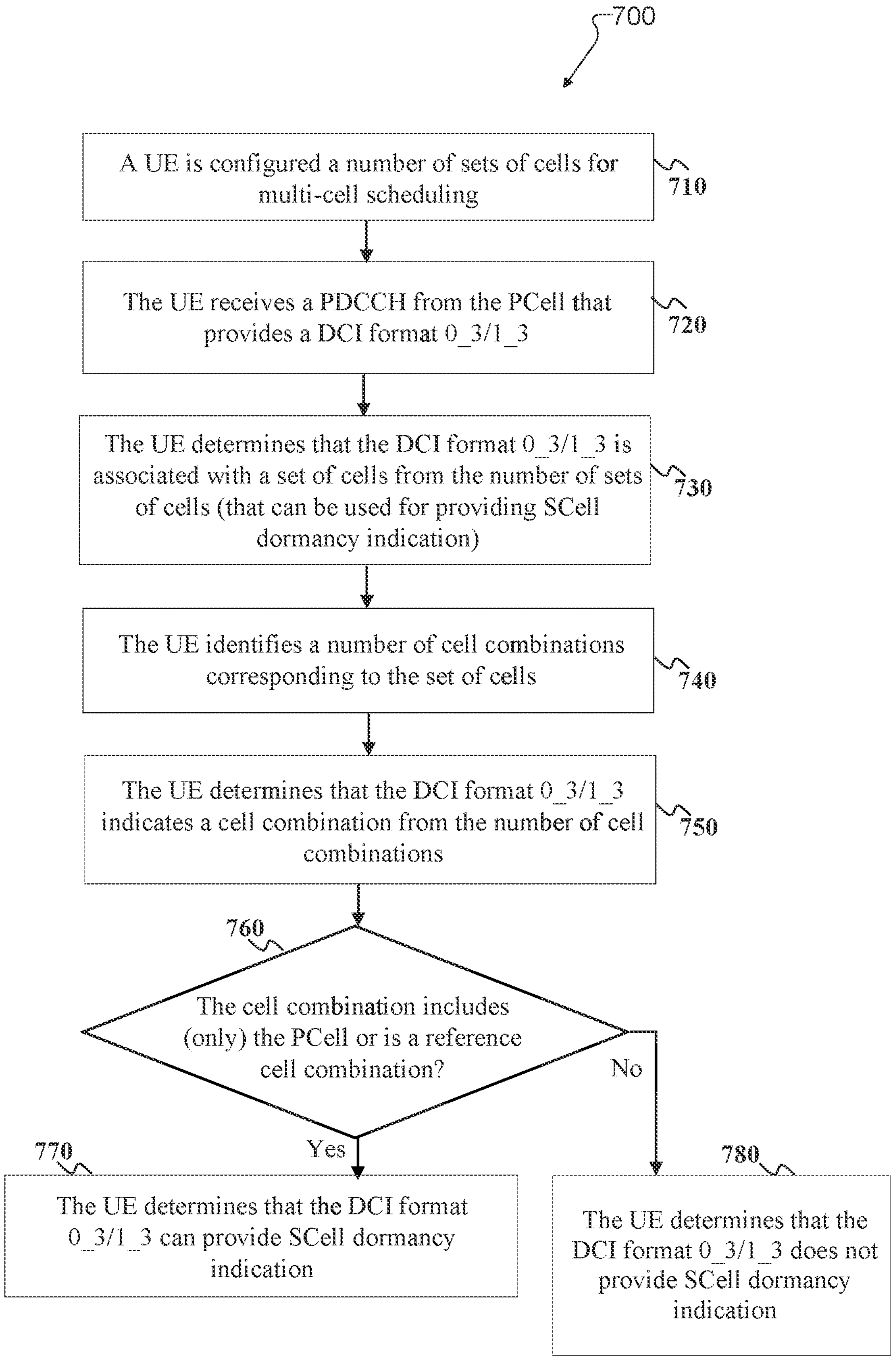
FIG. 7 illustrates a flowchart of an example UE procedure for determination of a DCI format providing a SCell dormancy indication according to embodiments of the present disclosure.

FIG. 7 illustrates a flowchart of an example UE procedure 700 for determination of a DCI format providing a SCell dormancy indication according to embodiments of the present disclosure. For example, procedure 700 for determination of a DCI format providing a SCell dormancy indication can be performed by the UE 112 of FIG. 1. This example is for illustration only and other embodiments can be used without departing from the scope of the present disclosure.

The procedure begins in 710, a UE is configured a number of sets of cells for multi-cell scheduling. In 720, the UE receives a PDCCH from the PCell that provides a DCI format 0_3/1_3. In 730, the UE determines that the DCI format 0_3/1_3 is associated with a set of cells from the number of sets of cells (that can be used for providing SCell dormancy indication). In 740, the UE identifies a number of cell combinations corresponding to the set of cells. In 750, the UE determines that the DCI format 0_3/1_3 indicates a cell combination from the number of cell combinations. In 760, the UE determines whether the cell combination includes (only) the PCell or is a reference cell combination. In 770, when the UE determines that the cell combination includes (only) the PCell or is the reference cell combination, the UE determines that the DCI format 0_3/1_3 can provide SCell dormancy indication; Otherwise, in 780, the UE determines that the DCI format 0_3/1_3 does not provide SCell dormancy indication.

In one embodiment, when a UE is configured a number of sets of cells for multi-cell scheduling, the UE can be provided SCell dormancy indication via a multi-cell scheduling DCI format 0_3 or 1_3 that schedules one or more PUSCHs or PDSCHs, respectively, on respective one or more cells in a set of cells, from the number of sets of cells. The DCI format can correspond to an RRC-configured or a reference/predetermined set of cells, or combination of co-scheduled cells, or a set/combination of cells that is selected by the gNB 102.

There can be different options for a scheduling cell of a DCI format 0_3 or 1_3 that provides SCell dormancy indication. In one example, a DCI format 0_3 or 1_3 indicating SCell dormancy (or non-dormancy) is provided by a PDCCH on the PCell. For example, the UE does not expect to be configured an RRC parameter for including of SCell dormancy indication field in DCI format 0_3/1_3 when the PCell is not a scheduling cell for any set of cells for multi-cell scheduling or when the PCell is not included in any set of cells for multi-cell scheduling. In another example, a DCI format 0_3 or 1_3 indicating SCell dormancy can be provided by a PDCCH on any scheduling cell, including an SCell. For example, a DCI format 0_3 or 1_3 indicating SCell dormancy (or non-dormancy) can be provided by a PDCCH on a reference scheduling cell, such as a scheduling cell with smallest (or largest) cell index, or a cell index of a scheduling cell can be provided by RRC.

There can be a number of options with respect to a set of cells associated/indicated by a DCI format 0_3 or 1_3 that can provide SCell dormancy indication. In various examples, a DCI format 0_3 or 1_3 is associated with a set of cells when the set of cells includes the scheduling cell, the DCI format 0_3 or 1_3 is associated with a first USS set on the scheduling cell, and the UE is not provided any second/linked USS set on any cell, other the scheduling cell, in the set of cells that is linked with the first USS set (i.e., with a same USS set ID as the first USS set). For example, a DCI format 0_3 or 1_3 is associated with a set of cells when the DCI format 0_3 or 1_3 is associated with a first USS set on the scheduling cell, and the UE is configured a second/linked USS set on a (reference) cell in the set of cells that is linked with the first USS set (i.e., with a same USS set ID as the first USS set). For example, a DCI format 0_3 or 1_3 indicates a set of cells when the DCI format includes a field, such as a scheduled cell set indicator field, to indicate a set of cells. For example, the UE includes the scheduled cell set indicator field when the UE is configured more than one set of cells for multi-cell scheduling associated with a same scheduling cell.

In one example, a DCI format 0_3 or 1_3 used for SCell dormancy indication can be associated with any set of cells for multi-cell scheduling or can indicate any set of cells for multi-cell scheduling. For example, a DCI format 0_3 or 1_3 indicating SCell dormancy can indicate/be associated with a set of cells that: (i) includes the PCell only; or (ii) includes PCell and some SCells; or (iii) does not include the PCell, and includes only one or more SCells.

In one example, a DCI format 0_3 or 1_3 indicating SCell dormancy can indicate/be associated with a set of cells that includes the PCell and zero, one, or multiple SCells. For example, the UE does not expect to be provided SCell dormancy indication by a DCI format 0_3 or 1_3 when an associated/indicated set of cells (i) does not include/indicate the PCell; or (ii) includes/indicates any cell other than the PCell. For example, a DCI format 0_3 or 1_3 indicating SCell dormancy can indicate/be associated with any set of cells that is scheduled by the PCell, regardless of whether the set of cells includes or does not include the PCell.

In one example, a DCI format 0_3 or 13 indicating SCell dormancy can indicate/be associated with a set of cells, wherein the set of cells (or index thereof) is indicated by higher layers. For example, an RRC parameter for SCell dormancy indication can provide an index for a set of cells associated/indicated by a DCI format 0_3 or 1_3 that provides SCell dormancy indication.

In one example, a DCI format 0_3 or 1_3 indicating SCell dormancy can indicate/be associated with a reference set of cells, such a set of cells, from the number of sets of cells, that: (i) includes a cell with smallest/largest cell index, or (ii) has a smallest/largest set index, or (iii) is associated with n_CI=0 (or a smallest/largest n_CI value among n_CI values associated with the number of sets of cells) for PDCCH monitoring according to an associated USS set, or (iv) has a smallest/largest number of cells and includes the PCell, or (v) has a smallest/largest number of cells and includes a smallest/largest cell index or (vi) has no 'Scheduled cell set indicator' field or a 'Scheduled cell set indicator' field is set to 0. For example, the UE does not expect to be provided a DCI format 0_3 or 1_3 for SCell dormancy indication that indicates/is associated with a set of cells for multi-cell scheduling, other than the reference set of cells. For example, the reference set of cells can be scheduled by the PCell.

In one example, a DCI format 0_3 or 13 indicating SCell dormancy can indicate/be associated with any set of cells, from the number of sets of cells, associated with a reference scheduling cell, such as a scheduling cell with smallest/largest cell index. For example, the reference scheduling cell can be a scheduling (with smallest/largest cell index) that is associated with only one set of cells for multi-cell scheduling.

Options herein can be combined as well. For example, a DCI format 0_3 or 1_3 indicating SCell dormancy can indicate/be associated with:

- a set of cells for multi-cell scheduling that includes the PCell, if such set of cells is configured,
- otherwise, a set of cells (scheduled from the PCell) with set index configured by RRC for SCell dormancy indication, or a reference set of cells, as previously described.

There can be a number of options with respect to a cell combination, from a set of cells, indicated by a DCI format 0_3 or 1_3 that can provide SCell dormancy indication. In various examples, a DCI format 0_3 or 1_3 can indicate a cell combination from an indicated/associated set of cells for multi-cell scheduling by: (i) an explicit field in the DCI format, such as a scheduled cells indicator field, that indicates a co-scheduled cell combination, or (ii) implicit determination based on FDRA, wherein the DCI format includes a number of values/fields for FDRA equal to a number of cells in the set of cells, and a reserved value (such as all 0s or all 1s) for a cell indicates that the cell is not included in the cell combination, and a non-reserved value for a cell indicates that the cell is included in the cell combination. In one example, a DCI format 0_3/1_3 can include invalid/reserved FDRA values for some cells from a cell combination indicated by a 'Scheduled cells indicator' field.

In one example, a DCI format 0_3 or 1_3 used for SCell dormancy indication can indicate only the PCell. For example, the UE does not expect to be provided a DCI format 0_3 or 1_3 for SCell dormancy indication that indicates a cell combination that (i) does not include the PCell, or (ii) includes cells other the PCell.

In one example, a DCI format 0_3 or 1_3 used for SCell dormancy indication can indicate any cell combination:

- that includes the PCell, such as a cell combination including the PCell and zero, one, or multiple SCells; or
- from a set of cells that includes the PCell, even if the cell combination does not include the PCell; or
- from a set of cells that is scheduled by the PCell (that is, with a PDCCH from the PCell), even if the set of cells or the cell combination does not include the PCell.

In one example, a DCI format 0_3 or 1_3 used for SCell dormancy indication can indicate any cell combination from any set of cells. For example, the cell combination can include SCells only. For example, the cell combinations can be from a set of cells that does not include the PCell. For example, the cell combination can be from a set of cells that is not scheduled by the PCell.

In one example, a DCI format 0_3 or 1_3 used for SCell dormancy indication can (only) indicate a reference cell combination, such as a cell combination with a cell combination index=0 (such as a value of 'Scheduled cells indicator' field), or a cell combination with a smallest/largest cell combination index, or a cell combination with smallest/largest number of cells, or a cell combination with smallest/largest numbers of cells or with smallest or largest cell combination index that includes the PCell, or a cell combination with smallest/largest numbers of cells that includes a cell with smallest/largest cell index. For example, the UE does not expect a DCI format 0_3 or 1_3 to be used for SCell dormancy indication when the indicated co-scheduled cell combination is not the reference cell combination.

In one example, a DCI format 0_3 or 1_3 used for SCell dormancy indication can indicate a cell combination whose information/index is provided by higher layers. For example, an RRC parameter for SCell dormancy indication can provide an index of a cell combination that can be indicated by a DCI format 0_3 or 1_3 used for SCell dormancy indication. For example, the UE does not expect a DCI format 0_3 or 1_3 to be used for SCell dormancy indication when the indicated co-scheduled cell combination is not same as a cell combination with an index configured for SCell dormancy indication.

Options herein can be combined as well. For example, a DCI format 0_3 or 1_3 indicating SCell dormancy can indicate:

- a/any co-scheduled cell combination that includes (only) the PCell (with fewest number of cells or with smallest SCell indexes), if such cell combinations are configured; and/or
- otherwise, a co-scheduled cell combination (scheduled by the PCell) with a cell combination index configured by RRC for SCell dormancy indication, or a reference co-scheduled cell combination (scheduled by the PCell), as previously described.

In one example, there may be constraints on a co-scheduled cell combination that can be indicated in a DCI format 0_3 or 1_3 that is used for SCell dormancy indication. For example, the UE does not expect to be provided SCell dormancy indication by a cell combination that includes SCell(s) for which the DCI format 0_3 or 1_3 indicates the SCell(s) to switch BWP to a dormant BWP.

In one embodiment, a DCI format 0_3/1_3 can both provide SCell dormancy indication using an explicit DCI field and schedule PDSCHs/PUSCHs on the PCell or one or more SCells.

In one example, when a UE is configured a higher layer parameter for presence of an SCell dormancy indication field in a DCI format 0_3 or 1_3 (e.g., set to 'true', 'enabled', or 'present'), the DCI format 0_3/1_3 includes an SCell dormancy field that is a bitmap, for example with 1, 2, 3, 4 or 5 bits, corresponding to a number of groups of SCells, referred to as dormancy groups each with a different DormancyGroupID, that is provided for example by higher layer parameter dormancyGroupWithinActiveTime. For example, each dormancy group can include one or more SCells. For example, each bit of the bitmap corresponds to one of the SCell dormancy groups configured by higher layer parameter dormancyGroupWithinActiveTime, with MSB to LSB of the bitmap corresponding to the first to last configured SCell group in ascending order of DormancyGroupID. For example, the field is (only) present when the DCI format 0_3 or 1_3 is carried by a PDCCH within DRX Active Time, and the UE is configured with at least two DL BWPs for an SCell. For example, the PDCCH can be (only) on the primary cell. For example, the PDCCH can be on any cell, including an SCell.

For example, when a DCI format 0_3/1_3 includes an SCell dormancy field, the DCI format can additionally schedule on some or all cells in a cell combination that is indicated by the DCI format 0_3/1_3. For example, when an indicated cell combination includes (only) the PCell, the DCI format 0_3/1_3 can schedule a PUSCH/PDSCH on the PCell together with SCell dormancy indication.

For example, when an indicated cell combination by a DCI format 0_3/1_3 includes (in addition to, or instead of, the PCell) one or more SCells, the DCI format 0_3/1_3 can schedule PUSCHs/PDSCHs on the one or more SCells together with SCell dormancy indication for groups of SCells that may or may not include the one or more SCells. One or more embodiments describe the UE procedures for PDSCH reception or PUSCH transmission on SCells that are scheduled by a DCI format 0_3/1_3 that provides SCell dormancy indication.

In one example, if a UE is provided search space sets to monitor PDCCH for detection of one or both of DCI format 0_3 or DCI format 1_3 and if DCI format 0_3 or DCI format 1_3 includes an SCell dormancy indication field:

- the SCell dormancy indication field is a bitmap with size equal to a number of groups of configured SCells, provided by dormancyGroupWithinActiveTime; and/or
- each bit of the bitmap corresponds to a group of configured SCells from the number of groups of configured Scells (in ascending order of group index).

When the UE detects a DCI format 0_3 or a DCI format 1_3 that indicates a predetermined or configured or an gNB-selected/arbitrary set/combination of cells for multi-cell scheduling as described in one or more embodiments herein (such as a set/combination of cells that includes the PCell) and includes the bitmap for SCell dormancy indication field:

- a ‘0’ value for a bit of the bitmap of the SCell dormancy indication field indicates an active DL BWP, provided by dormantBWP-Id, for the UE for each activated SCell in the corresponding group of configured SCells (e.g., remaining in dormant BWP or switching from an active non-dormant BWP to dormant BWP);
- a ‘1’ value for a bit of the bitmap of the SCell dormancy indication field indicates:
  - an active DL BWP, provided byfirstWithinActiveTime-BWP-Id, for the UE for each activated SCell in the corresponding group of configured SCells, if a current active DL BWP is the dormant DL BWP (e.g., switching from dormant BWP to an RRC-configured non-dormant BWP); and/or
  - a current active DL BWP, for the UE for each activated SCell in the corresponding group of configured SCells, if the current active DL BWP is not the dormant DL BWP (e.g., remaining in an active non-dormant BWP);
- the UE sets the active DL BWP to the indicated active DL BWP.

For example, the UE can report a capability to indicate whether the UE supports SCell dormancy indication based on an explicit field in one or both of a DCI format 1_3 and a DCI format 0_3.

Figure 8:
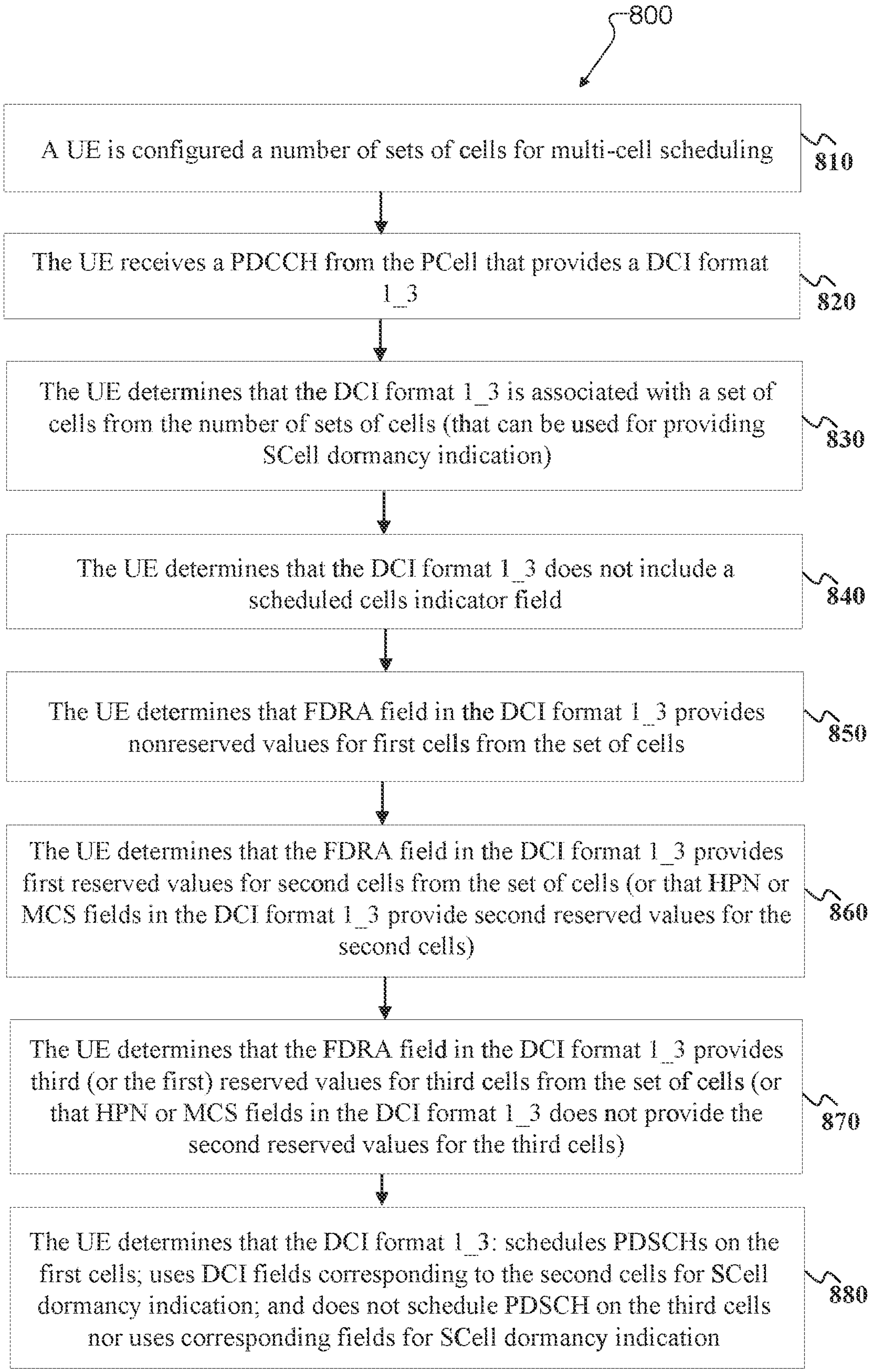
FIG. 8 illustrates a flowchart of an example UE procedure for determination of a DCI format providing both physical downlink shared channel (PDSCH) scheduling and SCell dormancy indication according to embodiments of the present disclosure.

FIG. 8 illustrates a flowchart of an example UE procedure 800 for determination of a DCI format providing both PDSCH scheduling and SCell dormancy indication according to embodiments of the present disclosure. For example, procedure 800 for determination of a DCI format providing both PDSCH scheduling and SCell dormancy indication can be performed by the UE of FIG. 3. This example is for illustration only and other embodiments can be used without departing from the scope of the present disclosure.

The procedure begins in 810, a UE is configured a number of sets of cells for multi-cell scheduling. In 820, the UE receives a PDCCH from the PCell that provides a DCI format 1_3. In 830, the UE determines that the DCI format 1_3 is associated with a set of cells from the number of sets of cells (that can be used for providing SCell dormancy indication). In 840, the UE determines that the DCI format 1_3 does not include a scheduled cells indicator field. In 850, the UE determines that FDRA field in the DCI format 1_3 provides non-reserved values for first cells from the set of cells. In 860, the UE determines that the FDRA field in the DCI format 1_3 provides first reserved values for second cells from the set of cells (or that HPN or MCS fields in the DCI format 1_3 provide second reserved values for the second cells). In 870, the UE determines that the FDRA field in the DCI format 1_3 provides third (or the first) reserved values for third cells from the set of cells (or that HPN or MCS fields in the DCI format 1_3 does not provide the second reserved values for the third cells). In 880, the UE determines that the DCI format 1_3: schedules PDSCHs on the first cells, uses DCI fields corresponding to the second cells for SCell dormancy indication, and does not schedule PDSCH on the third cells nor uses corresponding fields for SCell dormancy indication.

In one embodiment, a DCI format can provide reserved values for first DCI fields such as FDRA field of a DCI format 1_3 to validate SCell dormancy indication and can repurpose second DCI fields of the DCI format 1_3 to provide a bitmap for SCell dormancy indication. For example, the first and second DCI fields can correspond to the PCell or to one or more SCells. such as a reference SCell or SCells selected by the gNB 102. The DCI format can schedule PDSCHs on other cells with corresponding fields not used/repurposed for SCell dormancy indication. Such DCI format 1_3 can be provided by a PDCCH from the PCell or from any scheduling SCell. In one example, the UE does not expect a PDCCH to provide a DCI format 1_3 with repurposed fields for SCell dormancy validation/indication when the PDCCH is not from the PCell or when the PCell is not included in any set of cells for multi-cell scheduling.

In one example, a multi-cell scheduling DCI format, such as DCI format 1_3 (or DCI format 0_3), can provide SCell dormancy indication without using an SCell dormancy indication field. For example, certain first DCI fields from the DCI format 1_3 can be set to reserved values to validate that the DCI format 1_3 is used to provide SCell dormancy indication, and certain second DCI fields from the DCI format 1_3 can be repurposed for SCell dormancy indication. For example, the first and second DCI fields do not provide corresponding information for PDSCH scheduling. In such case, the SCell dormancy indication field is not present in the DCI format 1_3 or is present with a reserved value (thus discarded by the UE 116).

Such method can be beneficial, for example, when the UE is not configured the RRC parameter for SCell dormancy indication via DCI format 1_3 (for example, with value set to ‘false’ or ‘absent’ or ‘disabled’ or no parameter/value provided), for example, in order to save bits in DCI format 1_3 and reduce a size of the DCI format 1_3. The method can be also beneficial, for example, when the DCI format 1_3 provides SCell dormancy indication separately for each configured SCell, rather than an indication per group of cells (for example, per SCell dormancy groups with DormancyGroupIDs provided by higher layer parameter dormancyGroupWithinActiveTime). The latter per-cell indication of SCell dormancy can require additional bits, such as up to 7 bits for SCells corresponding to a scheduling cell or up to 15 bits for SCells in a PUCCH group or cell group (such as master cell group (MCG) or secondary cell group (SCG)). For example, in the latter case, the UE may be configured the RRC parameter for SCell dormancy indication via DCI format 1_3 (for example, with value set to 'true' or 'present' or 'enabled'), or the DCI format 1_3 may include the SCell dormancy indication field (while the field may be reserved and discarded by the UE 116). For example, a first DCI format 1_3 corresponding to a first scheduling cell (such as PCell) can provide SCell dormancy indication for a first number of SCells that are scheduled by the first scheduling cell, and a second DCI format 1_3 corresponding to a second scheduling cell can provide SCell dormancy indication for a second number of SCells that are scheduled by the second scheduling cell.

For example, first DCI fields in a DCI format 1_3 that are used for validation of SCell dormancy indication include one or more of the following: one-shot HARQ-ACK request field, or FDRA field. For example, one-shot HARQ-ACK request field is a cell-common field in the DCI format 1_3 with 0 or 1 bit. For example, FDRA is a cell-specific field in the DCI format 1_3 with a separate value for each cell in the co-scheduled cell combination indicated by the DCI format 1_3 or a separate value for each cell in a corresponding set of cells for multi-cell scheduling. When the UE validates that a DCI format 1_3 provides SCell dormancy indication, a DCI field for SCell dormancy indication, if present, is set to reserved value. For example, a one-shot HARQ-ACK request field is not present or has a '0' value. For example, FDRA field for one or more cells from an indicated cell combination are set to reserved values such as all 0s or all 1s. The selection of the one or more cells is subsequently described. For example, the reserved value for FDRA is: (i) all 0s for an FDRA resource allocation type 0, or all 1s for FDRA resource allocation type 1, or (ii) all 0s or all 1s for an FDRA with dynamic switch resource allocation type. For example, the reserved value for FDRA is only all 0s (and not all is) for an FDRA with dynamic switch resource allocation type.

In one example, first DCI fields for validation of SCell dormancy indication can include one or more fields from DCI format 1_3 other than (or in addition to) the one-shot HARQ-ACK request field or the FDRA field. For example, the first DCI fields can include one or more of: the enhanced Type 3 codebook indicator field, or the HARQ-ACK retransmission indicator field, or the minimum applicable scheduling offset indicator field, or the PDCCH monitoring adaptation indication field. For example, for validation of SCell dormancy indication, one or more of the mentioned fields are not present in DCI format 1_3 or have a certain reserved value such as a value 0 (or all 0s) or a value 1 (or all 1s).

In another example, the SCell dormancy indication field can be also/alternatively used for validation of the SCell dormancy indication. For example, for validation of SCell dormancy indication, the SCell dormancy indication field is not present or has a reserved value such as a value all 0s or all 1s.

For example, second DCI fields that are repurposed to provide a bitmap for SCell dormancy indication include one or more of the following fields that are concatenated with MSB to LSB in the order below:

Modulation and coding scheme of transport block 1;
New data indicator of transport block 1;
Redundancy version of transport block 1;
HARQ process number;
Antenna port(s); and/or
DMRS sequence initialization.

For example, the fields herein are repurposed for SCell dormancy indication at least when the DCI format 1_3 does not schedule PDSCHs on any of the cells in the set of cells. For example, the DCI format is used solely for SCell dormancy indication.

For example, MCS and NDI field (for TB 1) corresponding to one or more cells can be used as parts of the bitmap for SCell dormancy indication. For example, the one or more cells are same as the one or more cells for which a value of FDRA is set to reserved value (all 0s or all 1s) for validation of SCell dormancy indication. The selection of the one or more cells is subsequently described.

For example, HPN and RV are cell-specific fields and can have configurable size in the DCI format 1_3 and, for one or more cells such as cells without PDSCH scheduling, they can be used in the bitmap for SCell dormancy indication when they include one or more bits.

For example, when a cell is determined to have corresponding second DCI field values used as part of the bitmap for SCell dormancy indication, and the cell is configured two TBs per PDSCH, for example by a higher layer parameter maxNrofCodeWordsScheduledByDCI set to value 2, values of the MCS, NDI and RV of TB 2 can be also used as part of the bitmap for SCell dormancy indication.

For example, when DCI format 1_3 is used for both PDSCH scheduling and SCell dormancy indication, some fields from the fields herein may not be repurposed for SCell dormancy indication. For example, when the Antenna port(s) field is configured to a be cell-common field for the DCI format 1_3, a value of the Antenna port(s) field is needed for the corresponding PDSCH receptions, so the Antenna port(s) field cannot be repurposed for SCell dormancy indication when the DCI format 1_3 schedules PDSCHs on some cells. For example, the Antenna port(s) field can be used for SCell dormancy indication when the Antenna port(s) field is configured as a cell-specific field that provides separate values for separate cells. In such case, values of the Antenna port(s) field corresponding to one or more cells can be used as part of the bitmap for SCell dormancy indication. For example, the one or more cells can be same as the one or more cells with respective values of FDRA field set to reserved values for validation of SCell dormancy indication. For example, the one or more cells include cells with no PDSCH scheduled by the DCI format 1_3. The selection of the one or more cells is subsequently described.

For example, a DMRS sequence initialization field is a cell-common field with a single value in the DCI format 1_3 that applies commonly to co-scheduled PDSCHs on the respective co-scheduled cells. Therefore, the DMRS sequence initialization field cannot be repurposed for SCell dormancy indication when the DCI format 1_3 schedules PDSHCs on some cells.

In one example, determination of whether some fields, such as Antenna port(s) or DMRS sequence initialization, are or are not repurposed for SCell dormancy indication is determined separately for each DCI format 1_3. For example, such fields can be repurposed for SCell dormancy indication in a first DCI format 1_3 that does not schedule any PDSCHs on any cells, and cannot be repurposed for SCell dormancy indication in a second DCI format 1_3 that schedules PDSCHs on one or more cells.

In another example, whether some fields, such as Antenna port(s) or DMRS sequence initialization, are or are not repurposed for SCell dormancy indication is predetermined in the specifications of system operation and apply to all DCI formats 1_3 regardless of whether or not a DCI format schedules or does not schedule PDSCHs on some cells. For example, the UE can be predetermined to exclude Antenna port(s) or DMRS sequence initialization from the list of second fields for SCell dormancy indication even when a DCI format does not 1_3 schedule any PDSCHs on any of the cells in the set of cells.

In another example, a DCI format 1_3 that is used for SCell dormancy indication is not expected to (or does not) schedule PDSCH on any cell, and values of Antenna port(s) or DMRS sequence initialization fields can be used as part of the bitmap for SCell dormancy indication. In another example, a DCI format 1_3 that is used for SCell dormancy indication can schedule one or more PDSCH receptions on one or more cells, while values of Antenna port(s) or DMRS sequence initialization fields can be used as part of the bitmap for SCell dormancy indication. In such case, the UE determines default/reference values for Antenna port(s) or DMRS sequence initialization for the one or more PDSCH receptions on one or more cells. For example, a value of 0 (or 1) is used as default/reference value for DMRS sequence initialization. For example, a default/reference value for the Antenna port(s) field can be a respective value provided by a row with smallest row index from a respective Antenna port(s) table corresponding to a respective cell from the one or more cells.

For example, the UE can report a capability to indicate whether the UE supports SCell dormancy indication by repurposing certain first/second fields from a DCI format 1_3.

For example, the second DCI fields that are repurposed for SCell dormancy indication, as described herein, constitute a bitmap for SCell dormancy indication, wherein each bit of the bitmap corresponds to one of the configured SCells or groups of SCells, in ascending order of cell or a cell group index.

The first and second DCI fields corresponding to one or more cells are used/repurposed for validation and indication of SCell dormancy, respectively, wherein the one or more cells can be determined as subsequently described.

For example, when the second DCI fields that are repurposed for SCell dormancy indication correspond to multiple cells, the MSB to LSB of the bitmap include the bits/values of second DCI fields, as described herein, from the lowest index cell to highest index cell, among the multiple cells.

There are a number of options about the one or more cells for which certain first and second DCI fields, from a DCI format 1_3, can be used for validation and indication of SCell dormancy indication.

For example, validation and indication of SCell dormancy can use certain first and second DCI fields corresponding to:

- the PCell when PCell is (the only cell) included in a cell combination that is indicated by DCI format 1_3; or
- the PCell and one SCell in a cell combination that is indicated by DCI format 1_3, such as:
  - an SCell with smallest/largest cell index (or cell-level CIF) in the cell combination; or
  - an SCell that is a reference SCell for the corresponding set of cells for multi-cell scheduling for counting DCI size or PDCCH candidates or non-overlapping CCEs of DCI format 1_3 (or 0_3) towards corresponding budget/limits for the reference cell, at least when the reference cell is included in the cell combination;
- the PCell and one SCell that is not included in a cell combination indicated by DCI format 1_3, that is, a non-scheduled/non-indicated SCell:
  - for example, a non-indicated/non-scheduled SCell with smallest/largest cell index (or cell-level CIF) when there are multiple SCells that are not indicated/scheduled in a cell combination by the DCI format 1_3; or
  - the reference cell for the corresponding set of cells (as previously described) when the reference cell is not included in the cell combination indicated by the DCI format 1_3;
- the PCell and more than one SCell (including all SCells) that:
  - are included in a co-scheduled cell combination indicated by DCI format 1_3 (for example, some/all of the cells indicted in the cell combination are used for SCell dormancy validation/indication); or
  - are not included in a co-scheduled cell combination indicated by DCI format 1_3 (for example, some/all cells that are not indicated/scheduled by the DCI format 1_3); or
  - are included in a corresponding set of cells for multi-cell scheduling (for example, some or all cells in the set of cells, irrespective of being indicated/scheduled or not-indicated/non-scheduled by the DCI format 1_3).

For example, non-indicated/non-scheduled cells can refer to cells for which the DCI format 1_3 provides invalid/reserved FDRA values, so no corresponding PDSCH is scheduled on the respective cells.

In one example, validation and indication of SCell dormancy can use certain DCI fields corresponding to cells other than PCell. For example, DCI format 1_3 can be used for both scheduling on the PCell and repurposed for SCell dormancy indication using fields corresponding to one or more SCells (and not values corresponding to the PCell). For example, validation and indication of SCell dormancy can use certain DCI fields corresponding to one or more SCells (and not the PCell) such as:

- an SCell with smallest/largest cell index (or cell-level CIF) in a co-scheduled cell combination that is indicated by the DCI format 1_3;
- an SCell (with smallest/largest cell index or cell-level CIF), from a corresponding set of cells for multi-cell scheduling, that is not included in the co-scheduled cell combination indicated by the DCI format 1_3;
- an SCell that is a reference SCell for the corresponding set of cells for multi-cell scheduling for counting DCI size or PDCCH candidates or non-overlapping CCEs of DCI format 1_3 (or 0_3) towards corresponding budget/limits for the reference cell, at least when the reference cell is included in the cell combination;
- one or more SCells that are (alternatively, are not) included in a cell combination indicated by the DCI format 1_3; and/or
- one or more SCells that are included in a corresponding set of cells for multi-cell scheduling.

In various example, values of first/second DCI fields corresponding to an SCell that is not indicated or scheduled by a DCI format 1_3 can be used for validation/indication of SCell dormancy (or non-dormancy) at least when the DCI format 1_3 includes separate values for one or more of FDRA/MCS/NDI/RV/HPN fields for the SCell. The latter condition holds, for example, at least when the UE is not configured a list of DL cell combinations for DCI format 1_3, so indication of co-scheduled cells is based on the FDRA field.

In various example, when the UE identifies more than one cell for which respective values for first/second DCI fields can be used for validation/indication of SCell dormancy or non-dormancy (according to examples herein), the UE determines a number of cells, from the more than once cell, to use for validation and indication of SCell dormancy based on a number of SCells or a number of groups of SCells that are configured for the UE 116. For example, when the UE is configured N SCells and when a number of bits for the second DCI fields, corresponding to a cell c, from the more than one cell, includes L_c bits, the DCI format 1_3 uses M cells from the more than one cell (per examples herein) such that M is the smallest value for which $$\sum_{c=1}^{M} L_c > N.$$

In one example, when a number L_c of bits for the second DCI fields is same for all corresponding cells, i.e., L_c=L, the DCI format uses M=ceiling (N/L) cells, from the more than one cell (per examples herein) for the purpose of identifying SCells or groups of SCells for dormancy operation (indication of whether an active BWP for an SCell or for a group of SCells switches to or from a dormant BWP or remains unchanged). For example, M≤N. For example, M is smaller than or equal to a maximum number of cells that can be co-scheduled by a DCI format 1_3, or smaller than or equal to a maximum number of cells that is/can be included in a set of cells for multi-cell scheduling, such as M≤4. For example, the DCI format 1_3 uses bits corresponding to the second DCI fields for first M cells, from the more than one cell (per examples herein), in ascending order of cell index. For example, the DCI format 1_3 uses bits corresponding to the second DCI fields for first M cells, from the more than one cell (per examples herein), that are from the cell combination indicated by the DCI format 1_3 or from the set of cells associated with the DCI format 1_3. For example, when determining the condition $$\sum_{c=1}^{M} L_c > N,$$

the UE sorts the cells in descending order of length/size of $L_c$ (not necessarily in the order of cell index), so cell c=1 corresponds to largest $L_c$ value, cell c=2 corresponds to second largest $L_c$ value, and so on. When two cells have a same $L_c$ value, they are ordered in ascending or descending order of cell index. For example, the UE provides SCell dormancy indication by repurposing second DCI fields corresponding to M cells with smallest cell index that have invalid/reserved FDRA values in DCI format 1_3 and can provide the largest number of bits for the corresponding second DCI fields. For example, M=1, so only second DCI fields corresponding to one cell is used for SCell dormancy indication. For example, M=1 corresponds to the smallest cell index that is identified for providing SCell dormancy indication. For example, M=1 corresponds to a cell with largest $L_c$ value (with smallest cell index). For example, when a total number of bits for the second DCI field corresponding to the M cells (or the M-th cell) exceeds N bits that is needed for SCell dormancy indication for the N configured SCells or the N configured groups of SCells, the UE discards the remaining bits.

In various examples, N can be a maximum number of supported SCells (in the specifications or by the UE capability) for a scheduling cell or across scheduling cells in a PUCCH group or in a cell group (such as MCG or SCG). For example, a value of N can be fixed in the specifications of system operation, such as N=15, or a value of N can be provided by higher layers.

In one example, validation and indication of SCell dormancy can use certain DCI fields corresponding to one or more cells in a set of cells for multi-cell scheduling, wherein cell indexes corresponding to the one or more cells are provided by higher layer parameters, such as by a parameter in the RRC configuration for SCell dormancy (via DCI format 1_3).

In one example, there may be no RRC configuration or predetermined rules for determining cell(s) whose corresponding second DCI fields in the DCI format 1_3 is used for validation and indication of SCell dormancy. For example, the UE checks the second DCI fields, such as FDRA, corresponding to all cells in the DCI format 1_3 and determines which cells are used for SCell dormancy indication based on values of the first DCI fields for validation of SCell dormancy indication. For example, when a value of first DCI fields (for validation of SCell dormancy indication) such as FDRA corresponding to a cell is set to reserved values, the UE determines that second DCI fields corresponding to the cell are repurposed to provide (part of) the bitmap for SCell dormancy indication.

In one example, validation and indication of SCell dormancy can use first/second DCI fields, from a DCI format 1_3, corresponding to cells that are:

- indicated to remain in/switch to a dormant BWP, by the SCell dormancy indication provided by the DCI format 1_3 (that is, value '0' in the bitmap for SCell dormancy indication); or
- deactivated SCells.

For example, when the UE is not provided configuration information for a number/list of co-scheduled cell combinations for DCI format 1_3 (or DCI format 0_3), and the UE determines a cell combination for the DCI format 1_3 based on FDRA values:

- in one example, first DCI fields (for validation of SCell dormancy indication) such as FDRA corresponding to all cells/all DL cells in the set of cells for multi-cell scheduling are set to reserved values (such as all 0s or all 1s);
  - for example, SCell dormancy indication is provided by repurposing second DCI fields corresponding to all cells, or corresponding only to some cells from the set of cells, per RRC configuration or per predetermined rules as previously described, such as for PCell or zero or one or more SCells; or
- in another example, first DCI fields such as FDRA corresponding to RRC-configured or predetermined cells, from the corresponding set of cells, are set to reserved values, wherein the RRC configuration or predetermined rules are as previously described;
  - for example, SCell dormancy indication is provided by repurposing second DCI fields corresponding to the same cells that provide the validation;
  - for example, for cells that are RRC-configured or predetermined for SCell dormancy indication, a reserved value of FDRA field indicates no PDSCH is scheduled on the cell, and first/second DCI fields corresponding to the cell are used for validation/indication of SCell dormancy, while for other cells, a reserved value of FDRA field (only) indicates no PDSCH is scheduled without any usage for SCell dormancy indication; or in another example, first DCI fields such as FDRA for some cells are set to reserved value (arbitrarily per gNB decision in a respective transmission of the DCI format 1_3);

for example, SCell dormancy indication is provided by repurposing second DCI fields corresponding to the same cells that provide the validation.

In one example, a DCI format 1_3 that does not include a 'scheduled cells indicator' field can include reserved values for FDRA field corresponding to all cells, so does not schedule PDSCH on any cell, and uses second DCI fields corresponding to one or more cells for validation and indication of SCell dormancy operation. For example, the one or more cells can be determined using methods as previously described. For example, the one or more cells can include (only) the PCell. Accordingly, a DCI format 1_3 without a 'scheduled cells indicator' field can be used for SCell dormancy indication when the DCI format is not used for any PDSCH scheduling (i.e., reserved values for FDRA for all cells).

For example, when a DCI format 1_3 uses the FDRA field (rather than an explicit scheduled cells indicator field) to indicate a (scheduled) cell combination, the UE can determine whether a reserved value for FDRA field indicates a non-scheduled cell (without any SCell dormancy indication) or indicates a cell for which second DCI fields are repurposed for SCell dormancy indication using:

in a first option, different reserved values for indication of non-scheduled cell and cells for SCell dormancy indication. For example, for a cell with FDRA resource allocation type 0, a value all 0s indicates a non-scheduled cell, while a value all 1s indicates a cell with fields/values used for SCell dormancy indication; or for a cell with FDRA resource allocation type 1, a value all 1s indicates a non-scheduled cell, while a value all 0s indicates a cell with fields/values used for SCell dormancy indication; or for a cell with dynamic switch FDRA resource allocation type, a value all 0s or all 1s indicates a non-scheduled cell, while a value starting/ending with 1 and other bits set to 0s or a value starting/ending with 0 and other bits set to is indicates a cell with fields/values used for SCell dormancy indication. For example, when a reserved value is used for FDRA field corresponding to a cell to indicate SCell dormancy validation/indication, the DCI format 1_3 does not schedule PDSCH on the cell;

in a second option, fields other than/in addition to the FDRA field for validation of SCell dormancy indication. For example, when MCS value for a cell is set to a reserved value such as all 1s or HPN value for a cell is set to a reserved value such as all 0s, the UE determines that second DCI fields corresponding to the cell are used for SCell dormancy indication. For example, FDRA field with reserved value is also used for validation of SCell dormancy indication, so FDRA as well as MCS or HPN need to be set to reserved values for a cell to validate that second DCI fields corresponding to the cell provide SCell dormancy indication. In such case, the values of MCS or HPN corresponding to the cell cannot be used as part of the bitmap for SCell dormancy indication. In another example, validation of SCell dormancy indication is only based on MCS or HPN without using the FDRA value. For example, a reserved FDRA value for a first cell indicates that the first cell is not scheduled and is not used for SCell dormancy indication, while a reserved value of MCS or HPN for a second cell indicates that the second cell is not scheduled and is used for SCell dormancy indication. For example, the values of MCS or HPN for the second cell cannot be used as part of the bitmap for SCell dormancy indication, while the value of FDRA for the second cell can be used as part of the bitmap for SCell dormancy indication. Examples herein can apply with other fields such as NDI in addition to/instead of MCS or HPN.

For example, a UE validates that a detected DCI format 1_3 is (partially) repurposed to provide SCell dormancy indication when the UE is provided search space sets to monitor PDCCH for detection of the DCI format 1_3, and if:

the CRC of DCI format 1_3 is scrambled by a C-RNTI or a MCS-C-RNTI; and if a one-shot HARQ-ACK request field is not present in the DCI format 1_3 or has a '0' value;

and if the DCI format 1_3 indicates a predetermined or configured or an arbitrary set/combination of cells for multi-cell scheduling (as described in one or more embodiments herein, such as a set/combination of cells that includes the PCell); and if resourceAllocation=resourceAllocationType0 for a cell and all bits of the frequency domain resource assignment field in DCI format 1_3 corresponding to the cell are equal to 0; or resourceAllocation=resourceAllocationType1 for a cell and all bits of the frequency domain resource assignment field in DCI format 1_3 corresponding to the cell are equal to 1; or resourceAllocation dynamicSwitch for a cell and all bits of the frequency domain resource assignment field in DCI format 1_3 corresponding to the cell are equal to 0 or 1;

or when values of one or both of MCS or HPN for the cell are set to all 1s or all 0s in addition to/instead of the FDRA field, the UE 116 evaluates the DCI format 1_1 as indicating SCell dormancy, not scheduling a PDSCH reception for the cell, and for transport block 1 interprets the sequence of fields of:

modulation and coding scheme new data indicator redundancy version

HARQ process number antenna port(s)

DMRS sequence initialization as providing a bitmap to each configured SCell or group of SCells, in an ascending order of the SCell index or group index, where:

a '0' value for a bit of the bitmap indicates an active DL BWP, provided by dormantBWP-Id, for the UE 116 for a corresponding activated Scell;

a '1' value for a bit of the bitmap indicates:

an active DL BWP, provided byfirstWithinActiveTime-BWP-Id, for the UE 116 for a corresponding activated SCell, if a current active DL BWP is the dormant DL BWP.

a current active DL BWP, for the UE 116 for a corresponding activated SCell, if the current active DL BWP is not the dormant DL BWP.

the UE 116 sets the active DL BWP to the indicated active DL BWP;

wherein the cell is any cell from the set of cells for multi-cell scheduling associated/indicated by the DCI format 1_3 with FDRA value or MCS or HPN as herein, or when the cell is a cell, from the corresponding set of cells, that is identified based on RRC configuration or based on predetermined rules, as previously described.

In one example, when the UE uses first and second fields, from a DCI format 1_3, corresponding to a cell for validation and indication of SCell dormancy (or non-dormancy), the DCI format 1_3 does not schedule PDSCH on the cell.

For example, if a UE is provided search space sets to monitor PDCCH for detection of DCI format 1_3; and if

- the CRC of DCI format 1_1 is scrambled by a C-RNTI or a MCS-C-RNTI; and if
- a one-shot HARQ-ACK request field is not present or has a '0' value; and if
- a HARQ-ACK retransmission indicator field is not present or set to '0'; and if
- the UE detects a DCI format 1_3 provided by a PDCCH on the primary cell, for example:
  - corresponding to a set MC-DCI-SetofCells of more than one serving cells associated with nCI-Value equal to 0; or
  - corresponding to a set MC-DCI-SetofCells of more than one serving cells associated with smallest nCI-Value among the sets of cells MC-DCI-SetofCells with more than one serving cells corresponding to a same scheduling cell; or
  - that does not include a 'Scheduled cell set indicator' field, or includes a 'Scheduled cell set indicator' field with value equal to 0;
  - that does not include a 'Scheduled cells indicator' field, or includes a 'Scheduled cells indicator' field with value equal to 0;

and if, for one or more cells, from the [corresponding] set MC-DCI-SetofCells of more than one serving cells:

- resourceAllocation=resourceAllocationType0 and all bits of the frequency domain resource assignment field in DCI format 1_3 are equal to 0; or
- resourceAllocation=resourceAllocationType1 and all bits of the frequency domain resource assignment field in DCI format 1_3 are equal to 1; or
- resourceAllocation dynamicSwitch and all bits of the frequency domain resource assignment field in DCI format 1_3 are equal to 0 or 1;

the UE evaluates the DCI format 1_3 as indicating SCell dormancy, not scheduling a PDSCH reception:

- on a cell with smallest cell index from the one or more cells; or
- on a cell, with smallest cell index from the one or more cells, which provides the largest number of bits for the following sequence of fields; or
- on all cells from the one or more cells;

and interprets the sequence of fields including one or more of:

- modulation and coding scheme for transport block 1
- new data indicator for transport block 1
- redundancy version for transport block 1 [if configured]
- [modulation and coding scheme for transport block 2, if configured]
- [new data indicator for transport block 2, if configured]
- [redundancy version for transport block 2, if configured]
- HARQ process number [if configured]
- antenna port(s), [if configured as Type-2 field]
- [DMRS sequence initialization]

corresponding to:

- the cell (e.g., the cell with smallest cell index from the one or more cells); or
- the cell (e.g., the cell, with smallest cell index from the one or more cells, which provides the largest number of bits for the following sequence of fields); or
- the one or more cells, in ascending order of cell index as providing a bitmap to each configured SCell, in an ascending order of the SCell index, where:

- a '0' value for a bit of the bitmap indicates an active DL BWP, provided by dormantBWP-Id, for the UE for a corresponding activated Scell; and/or
- a '1' value for a bit of the bitmap indicates:
  - an active DL BWP, provided by firstWithinActiveTimeBWP-Id, for the UE for a corresponding activated SCell, if a current active DL BWP is the dormant DL BWP.
  - a current active DL BWP, for the UE for a corresponding activated SCell, if the current active DL BWP is not the dormant DL BWP.
- the UE sets the active DL BWP to the indicated active DL BWP.

In one example, the above holds at least when higher layer parameter ScheduledCellCombo-ListDCI-1-3 for the scheduled cell set is not configured.

In one example, when higher layer parameter ScheduledCellCombo-ListDCI-1-3 for the scheduled cell set is not configured, the above holds when the part:

- and if, for one or more cells, from the [corresponding] set MC-DCI-SetofCells of more than one serving cells:
  - resourceAllocation=resourceAllocationType0 and all bits of the frequency domain resource assignment field in DCI format 1_3 are equal to 0, or
  - resourceAllocation=resourceAllocationType1 and all bits of the frequency domain resource assignment field in DCI format 1_3 are equal to 1, or
  - resourceAllocation dynamicSwitch and all bits of the frequency domain resource assignment field in DCI format 1_3 are equal to 0 or 1 can be replaced with the following;

- and if, for one or more cells, from the [corresponding] set MC-DCI-SetofCells of more than one serving cells:
  - resourceAllocation=resourceAllocationType0 and all bits of the frequency domain resource assignment field in DCI format 1_3 are equal to 1 (or equal to a starting '0' bit followed by remaining '1' bits or equal to a starting '1' bit followed by remaining '0' bits), or
  - resourceAllocation=resourceAllocationType1 and all bits of the frequency domain resource assignment field in DCI format 1_3 are equal to 0 (or equal to a starting '1' bit followed by remaining '0' bits or equal to a starting '0' bit followed by remaining '1' bits), or
  - resourceAllocation dynamicSwitch and bits of the frequency domain resource assignment field in DCI format 1_3 are equal to 0 followed by all 1s or 1 followed by all 0s (or equal to a starting '0' bit followed by remaining '1' bits or a starting '1' bit followed by remaining '0' bits).

Figure 9:
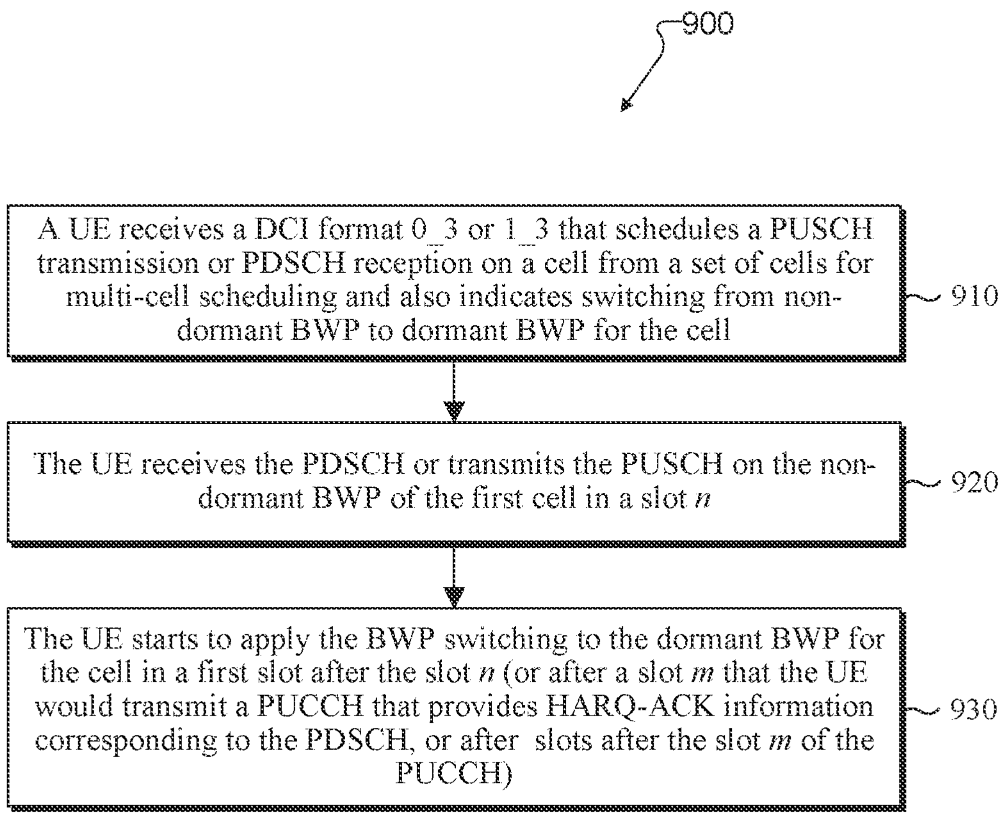
FIG. 9 illustrates a flowchart of an example UE procedure for switching to dormant bandwidth part (BWP) scheduled by a DCI format according to embodiments of the present disclosure.

FIG. 9 illustrates a flowchart of an example UE procedure 900 for switching to dormant BWP scheduled by a DCI format according to embodiments of the present disclosure. For example, procedure 900 for switching to dormant BWP scheduled by a DCI format can be performed by any of the UEs 111-116 of FIG. 1. This example is for illustration only and other embodiments can be used without departing from the scope of the present disclosure.

The procedure begins in 910, a UE receives a DCI format 0_3 or 1_3 that schedules a PUSCH transmission or PDSCH reception on a cell from a set of cells for multi-cell scheduling and also indicates switching from non-dormant BWP to dormant BWP for the cell. In 920, the UE receives the PDSCH or transmits the PUSCH on the non-dormant BWP of the first cell slot n. In 930, the UE starts to apply the BWP switching to the dormant BWP for the cell in a first slot after the slot n (or after a slot m that the UE would transmit a PUCCH that provides HARQ-ACK information corresponding to the PDSCH, or after $$3N_{slot}^{subframe,\mu}$$

slots after the slot m of the PUCCH).

In one embodiment, when a DCI format 0_3/1_3 provides SCell dormancy indication and also schedules PUSCHS/PDSCHs on some cells from a corresponding set of cells, the UE transmits PUSCHs or receives PDSCHs on the PCell or on activated SCells that have a non-dormant BWP and are not indicated by SCell dormancy indication of the DCI format 0_3/1_3 to switch to a dormant BWP. In another option, the UE can transmit PUSCHs or receive PDSCHs on SCells with active non-dormant BWP before switching to a dormant BWP as indicated by the SCell dormancy indication provided by the DCI format 0_3/1_3, at least when the UE has sufficient time for such PUSCH transmission or PDSCH reception before switching to dormant BWP or the switching to the dormant BWP can be specified to occur after the PUSCH transmission or PDSCH reception, for example when the PDSCH reception provides a last transport block available for the UE 116.

A DCI format 0_3/1_3 with SCell dormancy indication can refer to: (i) a DCI format 0_3/1_3 that provides SCell dormancy indication using a field and also schedules PDSCH receptions on cells (for example, the PCell) from a corresponding set of cells, as described in one or more embodiments herein or (ii) a DCI format 0_3/1_3 that provides SCell dormancy indication by repurposing first DCI fields for one or more cells to validate the SCell dormancy indication and second DCI fields for the one or more cells for providing a bitmap for SCell dormancy indication, and the DCI format 0_3/1_3 may or may not schedule PUSCHs/PDSCHs on cells from the corresponding set of cells, as described in one or more embodiments herein.

In one example, a DCI format 0_3/1_3 with SCell dormancy indication can (only) schedule PUSCH/PDSCH on the PCell. In another example, a DCI format 1_3 that repurposes certain first/second DCI fields corresponding to the PCell to provide SCell dormancy indication, as described in one or more embodiments herein, does not schedule a PDSCH on the PCell.

In one example, a DCI format 0_3/1_3 with SCell dormancy indication can schedule PUSCHs/PDSCHs on one or more SCells, from a corresponding set of cells for multi-cell scheduling. In another example, a DCI format 1_3 that repurposes certain first/second DCI fields corresponding to an SCell to provide SCell dormancy indication, as described in one or more embodiments herein, corresponding to an SCell does not schedule a PDSCH on the SCell.

In one example, a DCI format 0_3/1_3 with SCell dormancy indication does not expect to schedule on a deactivated SCell or an SCell that has an active BWP that is a dormant BWP. For example, the DCI format only schedules PDSCHs/PUSCHs on activated SCell with non-dormant BWP. For example, the UE drops/discards a DCI format 0_3/1_3 that schedules on some SCells that are deactivated or on dormant BWP and does not transmit any PUSCHs or receive any PDSCHs even on active cells with non-dormant BWPs.

In another example, a DCI format 0_3/1_3 with SCell dormancy indication can schedule on all SCells in an indicated cell combination, regardless of whether or not the SCells are deactivated or have an active BWP that is a dormant BWP. For example, the UE discards the PUSCH/PDSCH scheduling information for a SCell when the SCell is deactivated or has an active BWP that is a dormant BWP. For example, the UE does not transmit a corresponding PUSCH or receive a corresponding PDSCH on the SCell. For example, the UE transmits PUSCHs or receives PDSCHs on SCells in the indicated cell combinations that are activated SCells with non-dormant BWPs.

In one example, a UE does not expect a DCI format 0_3/1_3 with SCell dormancy indication to perform scheduling on an SCell when the bitmap for SCell dormancy indication provided by the DCI format indicates switching to a dormant BWP for the SCell, such as by a value '0' in a bitmap for SCell dormancy indication that corresponds to the SCell or corresponds to an SCell dormancy group that includes the SCell. For example, the DCI format 0_3/1_3 with SCell dormancy indication may schedule a PUSCH/PDSCH on such SCell, and the UE discards the corresponding scheduling information, and does not transmit the corresponding PUSCH or receive the corresponding PDSCH on the SCell.

For example, the DCI format 0_3/1_3 schedules PUSCHs/PDSCHs on SCells that are: (i) activated SCells with non-dormant BWP and a bitmap for SCell dormancy indication includes values '1' in bits corresponding to the SCells (or corresponding to SCell dormancy groups that includes the SCells) thereby indicating the SCells to maintain the current active BWP, or (ii) activated SCells with active BWP being a dormant BWP and a bitmap for SCell dormancy indication includes values '1' in bits corresponding to the SCells (or corresponding to SCell dormancy groups that includes the SCells) thereby indicating the SCells to switch to an active non-dormant DL BWP, provided by firstWithinActiveTimeBWP-Id. For example, the UE transmits PUSCHs or receives PDSCHs that are scheduled (only) on such SCells. In one example, support of case (ii) can be along with timeline conditions. For example, the UE does not expect K0/K2 values indicated by the DCI format 0_3/1_3 indicate time offset values between the PDCCH reception and corresponding PDSCH reception or PUSCH transmission on a previously dormant SCell is smaller than a BWP switching delay from dormant DL BWP to an active non-dormant DL BWP. In another example, scheduling PDSCH or PUSCH on a cell with an active dormant BWP as in case (ii) is not supported, regardless of timeline conditions. For example, the UE does not expect to receive a PDCCH for a dormant SCell. For example, the UE does not expect to receive a DCI format 0_3/1_3 for a number of cells that includes a dormant SCell. For example, the UE can receive a DCI format 0_3/1_3 for a number of cells that includes dormant SCells, and the DCI format indicates invalid/reserved FDRA values for the dormant SCells, such that the dormant SCells are not scheduled.

In another example, a DCI format 0_3/1_3 with SCell dormancy indication can schedule PUSCH/PDSCH on an SCell in the indicated cell combination, regardless of whether or not the SCell dormancy indication indicates switching to a dormant BWP for the SCell.

For example, the UE can transmit a PUSCH or receive a PDSCH on an SCell when an active BWP of the SCell is a non-dormant BWP and the DCI format 0_3/1_3 provides an SCell dormancy indication that indicates to the SCell to switch to a BWP that is a dormant BWP. For example, the UE transmits a corresponding PUSCH or receives a corresponding PDSCH on the SCell before switching to a dormant BWP. For example, when a DCI format 0_3/1_3 scheduled PDSCHs on one or more cells and also provides SCell dormancy indication, the UE does not start a timeline to apply BWP switching (to dormant BWPs) from a slot of PDCCH reception (or a first slot after slot of PDCCH reception) that provides the DCI format 0/31_3. For example, the UE starts to apply the BWP switching for the SCell after transmission of the PUSCH or reception of the PDSCH or after transmission of a PUCCH/PUSCH that provides HARQ-ACK information corresponding to the PDSCH or after a number of N symbols/slots such as after 3 msec after transmission of a PUCCH/PUSCH that provides HARQ-ACK information corresponding to the PDSCH (rather than after reception of the DCI format 0_3/1_3 that indicates the SCell dormancy). For example, the UE starts to apply the BWP switching for the SCell in a slot n+

$$n + 3N_{slot}^{subframe,\mu}$$

or slot $$n + 3N_{slot}^{subframe,\mu} + 1,$$

wherein n is a slot for PDSCH reception or a slot when the UE would transmit a PUCCH with HARQ-ACK information corresponding to the PDSCH, and μ is the SCS configuration of the PUCCH or the SCS configuration of the PDSCH, or a minimum (or maximum) between SCS of the PUCCH and SCS of the PDSCH. For example, such timeline conditions can be replaced with other timeline conditions applicable for SCell dormancy.

For example, the UE can transmit a PUSCH or receive a PDSCH on an SCell that has an active non-dormant BWP and is indicated by a DCI format 0_3 or 1_3 to switch to a dormant BWP when the UE is scheduled by the DCI format 0_3 or 1_3 to transmit the PUSCH or receive the PDSCH on the SCell in a symbol/slot that is before N symbols or slots after receiving the DCI format 0_3 or 13, wherein the value Nis predetermined in the specifications of system operation or configured by RRC or provided by UE capability; For example, N=1 or 2 slots in SCS of 15 kHz or in SCS of the active BWP of the scheduling cell or SCS of the active BWP of the PUCCH cell on which a corresponding HARQ-ACK is provided. For example, the UE does not transmit the PUSCH or receive the PDSCH on the SCell otherwise.

For example, the UE can receive a PDSCH on an SCell that has an active non-dormant BWP and is indicated by a DCI format 0_3 or 1_3 to switch to a dormant BWP when:

- the UE is scheduled to receive the PDSCH on the SCell in a symbol/slot that is before transmission of a PUCCH or PUSCH that provides HARQ-ACK information corresponding to the DCI format 1_3 that provides SCell dormancy indication; or
- the UE would transmit/transmits a HARQ-ACK information corresponding to the PDSCH that is scheduled on the SCell before transmission of a PUCCH or PUSCH that provides/would provide HARQ-ACK information corresponding to the DCI format 1_3 that provides SCell dormancy indication.

For example, the UE does not receive the PDSCH on the SCell otherwise.

For example, examples herein can be modified by replacing a symbol/slot for 'transmission of a PUCCH/PUSCH that provides HARQ-ACK information corresponding to the PDSCH or corresponding to the DCI format for SCell dormancy indication' with a number of N symbols/slots such as 3 msec after 'transmission of a PUCCH/PUSCH that provides HARQ-ACK information corresponding to the PDSCH or corresponding to the DCI format for SCell dormancy indication'.

In one example, the UE can be provided an RRC parameter for enabling PDSCH scheduling along with SCell dormancy indication. When the parameter is enabled, a DCI format 1_3 can schedule on some cells, as previously described, and also provide SCell dormancy indication. When the parameter is disabled or not provided, a DCI format can provide SCell dormancy indication without any PDSCH scheduling. In one example, the UE can report a capability for PDSCH reception according to a DCI format 1_3 that schedules one or more PDSCHs.

Figure 10:
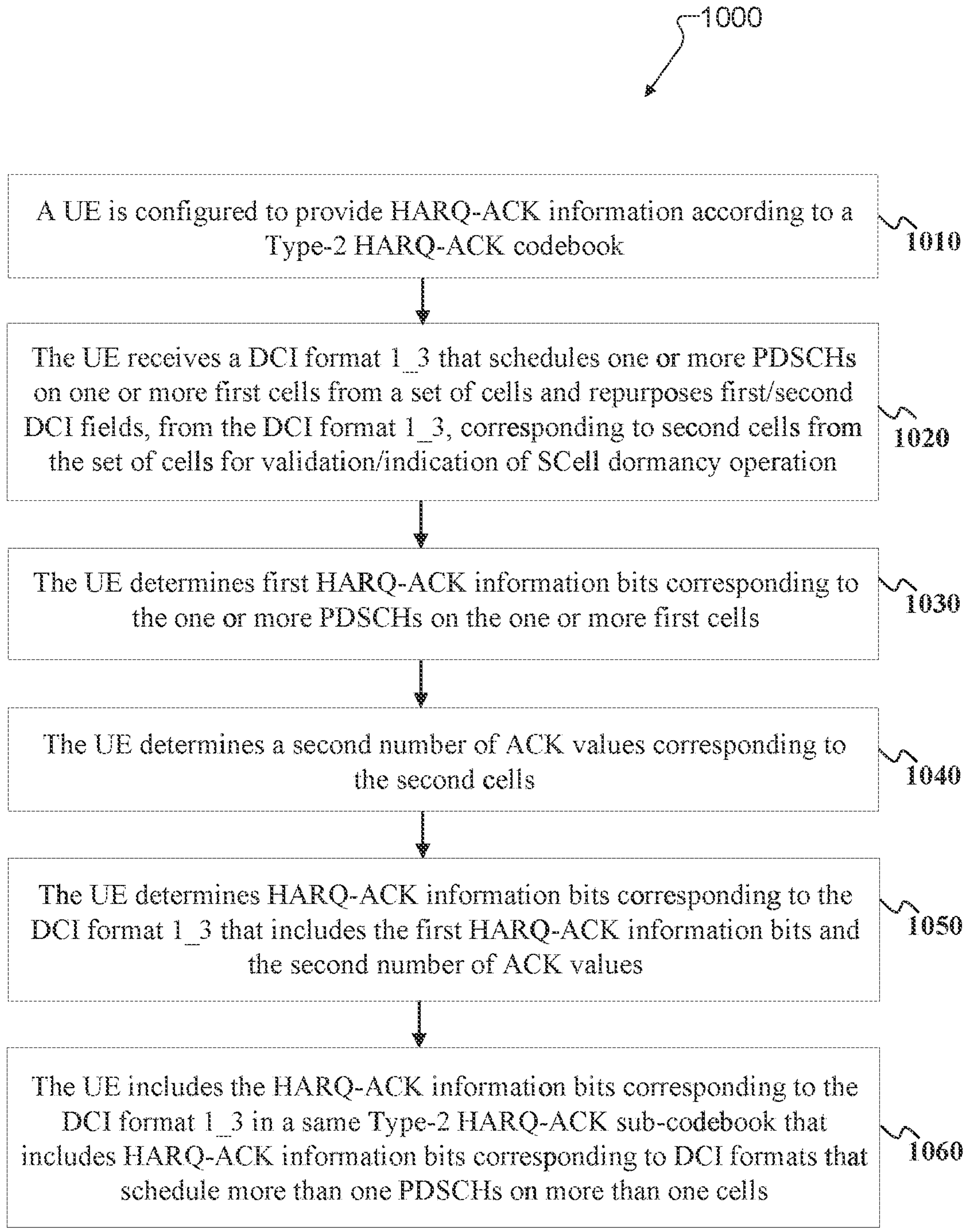
FIG. 10 illustrates a flowchart of an example UE procedure for a Type-2 hybrid automatic repeat request acknowledgement (HARQ-ACK) codebook according to embodiments of the present disclosure.

FIG. 10 illustrates a flowchart of an example UE procedure 1000 for a Type-2 HARQ-ACK codebook according to embodiments of the present disclosure. For example, procedure 1000 for a Type-2 HARQ-ACK codebook can be performed by the UE 112 of FIG. 1. This example is for illustration only and other embodiments can be used without departing from the scope of the present disclosure.

The procedure begins in 1010, a UE is configured to provide HARQ-ACK information according to a Type-2 HARQ-ACK codebook. In 1020, the UE receives a DCI format 1_3 that schedules one or more PDSCHs on one or more first cells from a set of cells and repurposes first/second DCI fields, from the DCI format 1_3, corresponding to second cells from the set of cells for validation/indication of SCell dormancy operation. In 1030, the UE determines first HARQ-ACK information bits corresponding to the one or more PDSCHs on the one or more first cells. In 1040, the UE determines a second number of ACK values corresponding to the second cells. In 1050, the UE determines HARQ-ACK information bits corresponding to the DCI format 1_3 that includes the first HARQ-ACK information bits and the second number of ACK values. In 1060, the UE includes the HARQ-ACK information bits corresponding to the DCI format 1_3 in a same Type-2 HARQ-ACK sub-codebook that includes HARQ-ACK information bits corresponding to DCI formats that schedule more than one PDSCHs on more than one cells.

In one approach, a UE provides HARQ-ACK information in response to a DCI format 1_3 that provides SCell dormancy indication, at least when the DCI format 1_3 does not schedule any PDSCHs on any cells. For example, the UE generates a 1-bit HARQ-ACK information, such as an ACK, for the DCI format 1_3.

In another approach, the UE provides a separate HARQ-ACK information bit in response to the DCI format 1_3 (to acknowledge a reception of the SCell dormancy indication) for each of the cells without scheduled PDSCH receptions (from the cell combination that is indicated by the DCI format 1_3), such as each cell from the cells for which certain DCI fields are repurposed for validation and indication of SCell dormancy. For example, this holds at least when the DCI format 1_3 schedules PDSCHs on some cells in a corresponding set of cells. The HARQ-ACK information for cells without a scheduled PDSCH receptions (such as with invalid/reserved FDRA) that are used for validation and indication associated with dormancy operation can be specified to have an ACK value (or a NACK value).

In yet another example, the UE provides a specified/predetermined HARQ-ACK information bit, such as a specified ACK (or a specified NACK) only for one cell that provides SCell dormancy indication. For example, such UE behavior applies when DCI fields for (only) one cell are repurposed for SCell dormancy indication, such as a cell with smallest index among cells with invalid FDRA values, or such a cell with smallest cell index that provides the largest number of repurposed bits among the cells with invalid FDRA value or such as a cell (with smallest index) among cells with especially invalid FDRA value (such as a starting 0 followed by remaining 1 bits, or vice versa) that is used (solely) for SCell dormancy indication. For example, such UE behavior applies when the UE provides the predetermined HARQ-ACK information bit such as a specified ACK value (or a specified NACK value) only for a reference cell among cells for which DCI fields are repurposed for SCell dormancy indication. For example, when DCI fields for N>1 cells are repurposed for SCell dormancy indication, the UE provides a specified ACK value (or a specified NACK value) for a cell with smallest index among the N cell and treats the remaining (N−1) cells same as any other cells without scheduled PDSCHs for which DCI fields are not repurposed for SCell dormancy indication. For example, the UE generates NACKs for such (N−1) cells.

In one example, when the UE is not configured HARQ-ACK spatial bundling, and when the UE is configured PDSCH reception with 2 TBs/codewords for a cell for which DCI fields are repurposed for SCell dormancy indication and the UE provides a specified HARQ-ACK information bit, such as a specified ACK value (to acknowledge the reception of the SCell dormancy indication), the UE generates 2 specified ACK values for the cell. In another example, the UE generates only one specified ACK value (for acknowledging the SCell dormancy indication) and generates a NACK corresponding to a second configured TB of the cell (as when a second TB is not scheduled for PDSCH reception). For example, DCI format 1_3 does not indicate a second TB for the cell. In yet another example, the UE generates only one specified ACK value and does not generate any HARQ-ACK information bit corresponding to the second configured TB for the cell.

In one example, the UE includes the specified HARQ-ACK information bit(s) corresponding to second cells providing (implicit) SCell dormancy indication in same order as for first cells with scheduled PDSCHs. For example, the UE orders the first and the second cells in ascending order of cell index and provides the corresponding HARQ-ACK information bits in the corresponding order. In another example, the UE includes the specified HARQ-ACK information bit(s) corresponding to the second cells providing (implicit) SCell dormancy indication after HARQ-ACK information bit(s) corresponding to the first cells with scheduled PDSCHs.

For example, when a DCI format 1_3 includes a scheduled cells indicator field that indicates a cell combination {cell #1, cell #2, cell #3, cell #4} and the DCI format schedules one PDSCH on each of cell #1 and cell #2, and repurposes DCI fields corresponding to cell #3 and cell #4 for validation and indication of SCell dormancy operation, the UE generates HARQ-ACK information bits corresponding to PDSCH receptions on cells #1 and #2, and generates ACK bits corresponding to cells #3 and #4 (to acknowledge the reception of SCell dormancy indication). For example, when a DCI format 1_3 does not include a scheduled cells indicator field and uses the FDRA field to indicate the scheduled and non-scheduled cells, the UE generates the specified ACK values for first non-scheduled cells (e.g., with reserved values for FDRA field) whose fields are used for validation and indication of SCell dormancy operation. For example, the UE does not generate any HARQ-ACK value, or generates a NACK value, for second non-scheduled cells (e.g., with reserved values for FDRA field) whose fields are not used for validation and indication of SCell dormancy operation.

When the DCI format 1_3 does not schedule any PDSCH reception and is used only for dormancy operation, the UE provides the one bit HARQ-ACK information in a same Type-2 HARQ-ACK sub-codebook (sub-CB) that the UE provides HARQ-ACK information corresponding to the case that a DCI format schedules a PDSCH reception on a single cell, such as a first Type-2 sub-CB. For example, a counter/total downlink assignment index (DAI) field in such a DCI format 1_3 is incremented according to a first counter/total DAI value corresponding to the first Type-2 HARQ-ACK sub-CB.

When the DCI format 1_3 schedules one or more PDSCH receptions and also provides SCell dormancy indication by repurposing DCI fields corresponding to some cells, the UE provides HARQ-ACK information bits assuming that the DCI format 1_3 schedules PDSCH receptions on a corresponding set of cells where values of HARQ-ACK information bits for cells with corresponding fields used for validation and indication associated with dormancy operation are set to a predetermined value such as ACK (or two ACK values for a cell from the cells when the cell is configured 2 TBs per PDSCH). The UE includes the HARQ-ACK information bits corresponding to such DCI format 1_3 in a same Type-2 HARQ-ACK sub-CB that the UE provides HARQ-ACK information corresponding to the case that a DCI format 1_3 schedules PDSCH receptions on multiple cells, such as a second Type-2 sub-CB. For example, a counter/total DAI field in such a DCI format 1_3 is incremented according to a second counter/total DAI value corresponding to the second Type-2 HARQ-ACK sub-CB.

For example, the UE includes a specified ACK value (or a NACK value) for a PDSCH on a cell that is scheduled by DCI format 1_3 when the DCI format 1_3 indicates BWP switching (from non-dormant BWP) to dormant BWP for the cell, and the UE drops/does not receive the PDSCH reception. For example, the UE determines a HARQ-ACK information bit for the PDSCH on the cell when the UE does not drop/receives the PDSCH before applying BWP switching to the dormant BWP (same as when a UE would determine a HARQ-ACK information bit for a PDSCH on a non-dormant BWP of a cell).

For example, the UE includes a specified NACK value (or ACK value) for a deactivated SCell or an activated SCell with an active dormant BWP.

In one example, the UE does not include any predetermined HARQ-ACK information bit(s) to acknowledge reception of an SCell dormancy indication, such as a specified ACK for cell for which DCI fields are repurposed for validation/indication of SCell dormancy operation. For example, such cells have invalid FDRA fields and are treated same as other cells without scheduled PDSCHs, for example, by including NACKs after HARQ-ACK information bits determined for cells with scheduled PDSCHs.

Figure 11:
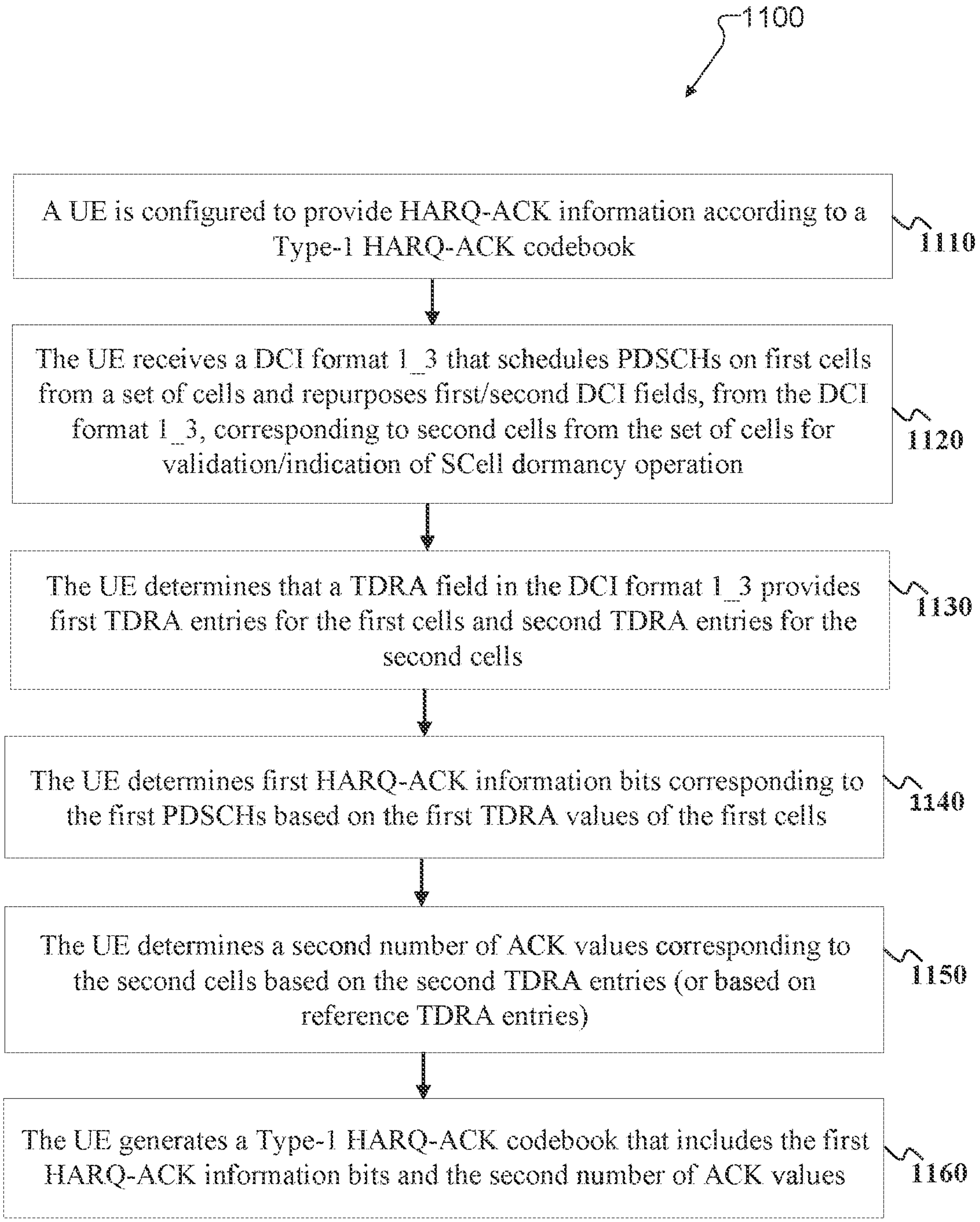
FIG. 11 illustrates a flowchart of an example UE procedure for a Type-1 HARQ-ACK codebook according to embodiments of the present disclosure.

FIG. 11 illustrates a flowchart of an example UE procedure 1100 for a Type-1 HARQ-ACK codebook according to embodiments of the present disclosure. For example, procedure 1100 for a Type-1 HARQ-ACK codebook can be performed by the UE of FIG. 3. This example is for illustration only and other embodiments can be used without departing from the scope of the present disclosure.

The procedure begins in 1110, a UE is configured to provide HARQ-ACK information according to a Type-1 HARQ-ACK codebook. In 1120, the UE receives a DCI format 1_3 that schedules PDSCHs on first cells from a set of cells and repurposes first/second DCI fields, from the DCI format 1_3, corresponding to second cells from the set of cells for validation/indication of SCell dormancy operation. In 1130, the UE determines that a time domain resource assignment (TDRA) field in the DCI format 1_3 provides first TDRA entries for the first cells and second TDRA entries for the second cells. In 1140, the UE determines first HARQ-ACK information bits corresponding to the first PDSCHs based on the first TDRA values of the first cells. In 1150, the UE determines a second number of ACK values corresponding to the second cells based on the second TDRA entries (or based on reference TDRA entries). In 1160, the UE generates a Type-1 HARQ-ACK codebook that includes the first HARQ-ACK information bits and the second number of ACK values.

When the UE is configured to provide HARQ-ACK information according to a Type-1 HARQ-ACK codebook, the UE may not support providing HARQ-ACK information in the Type-1 HARQ-ACK codebook when DCI format 1_3 does not schedule any PDSCH receptions and is used only for indicating SCell dormancy or non-dormancy. When DCI format 1_3 schedules PDSCH receptions on some cells from a set of cells, the UE provides HARQ-ACK information in the Type-1 HARQ-ACK codebook for the PDSCH receptions. The UE may provide a predetermined HARQ-ACK value, such as an ACK value (or a NACK value), for corresponding TDRA entries of cells (in the cell combination indicated by the DCI format 1_3) without scheduled PDSCH receptions. A TDRA entry associated with the HARQ-ACK information of a cell without scheduled PDSCH receptions can be the TDRA entry indicated by DCI format 1_3 or a reference TDRA entry indicated by higher layers or determined by the UE based on predetermined rules in the specifications of system operation. The value of the HARQ-ACK information bit can be an ACK in order to indicate the correct reception of the DCI format 1_3 and of the dormancy/non-dormancy indication and therefore differentiate from a NACK value that would be generated when the UE fails to correctly receive the DCI format 1_3 or the PDSCH receptions.

Various methods and examples of UE behavior for Type-2 or Type-1 HARQ-ACK codebook holds when certain DCI fields (such as one or more of MCS, NDI, RV, HPN, and so on) for cell(s) with invalid FDRA in a DCI format 1_3 are used to (implicitly) indicate UE behaviors other than SCell dormancy indication, such as for indication of HARQ-ACK codebook retransmission, or for (enhanced) Type-3 HARQ-ACK codebook trigger, or for TCI state indication, or for SPS PDSCH deactivation/release (or activation), or for configured-grant (CG) PUSCH deactivation/release (or activation), and so on.

In one example, the UE does not provide HARQ-ACK information in response to a DCI format 1_3 that provides SCell dormancy indication using an explicit field for SCell dormancy indication.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method comprising:
receiving:
first information for a set of serving cells,
a downlink control information (DCI) format, wherein the DCI format:
schedules reception of a physical downlink shared channel (PDSCH) on a first serving cell from the set of serving cells,
includes a frequency domain resource allocation (FDRA) field providing a first value that is associated with the first serving cell and is different from predetermined values, and
provides an indication for a dormant or a non-dormant active downlink (DL) bandwidth part (BWP) for each serving cell from second serving cells, wherein the indication is provided by values of first fields in the DCI format that are associated with a third serving cell from the set of serving cells when:
second fields are not present in the DCI format or are reserved, wherein the second fields include at least one of:
a dormancy indication field,
a one-shot hybrid automatic repeat request acknowledgment (HARQ-ACK) request field, and
a HARQ-ACK retransmission indicator field, and
a third value of the FDRA field in the DCI format that is associated with the third serving cell is one of the predetermined values, and
the PDSCH on the first serving cell; and
determining the dormant or non-dormant active DL BWP for each serving cell from the second serving cells based on the indication.

2. The method of claim 1, wherein:
the DCI format is provided by a physical downlink control channel (PDCCH) reception on a primary cell (PCell); and
the predetermined values are comprised of bits that are:
all equal to 0 for an FDRA type 0,
all equal to 1 for an FDRA type 1, or all equal to either 0 or 1 for a dynamic switching of an FDRA type.

3. The method of claim 1, wherein the indication is for a non-dormant DL BWP for the first serving cell.

4. The method of claim 1, further comprising:

receiving second information for a field type for an antenna ports (AP) field in the DCI format; and determining:

the AP field to be among the first fields, when the field type indicates that the AP field provides separate values for each serving cell from first serving cells including the first serving cell and the third serving cell, and the AP field not to be among the first fields, otherwise.

5. The method of claim 1, further comprising:

determining:

HARQ-ACK information bits corresponding to the DCI format, wherein the HARQ-ACK information bits are based on:

HARQ-ACK information corresponding to the PDSCH reception on the first serving cell, and a positive acknowledgement (ACK) bit corresponding to the indication and associated with the third serving cell, wherein an ordering of the HARQ-ACK information bits is based on an ascending order of serving cell index among the first serving cell and the third serving cell, and a HARQ-ACK codebook that includes the HARQ-ACK information bits; and transmitting a physical uplink control channel (PUCCH) or a physical uplink shared channel (PUSCH) that provides the HARQ-ACK codebook.

6. The method of claim 5, wherein:

the HARQ-ACK codebook is determined by appending a second HARQ-ACK sub-codebook to a first HARQ-ACK sub-codebook;

the first HARQ-ACK sub-codebook corresponds to first DCI formats, wherein a DCI format from the first DCI formats:

schedules a single PDSCH reception on a single serving cell, or is associated with HARQ-ACK information without scheduling a PDSCH reception;

the second HARQ-ACK sub-codebook corresponds to second DCI formats, wherein a DCI format from the second DCI formats schedules more than one PDSCH receptions on respective more than one serving cells; and the HARQ-ACK information is included in the second HARQ-ACK sub-codebook.

7. The method of claim 5, wherein:

a fourth value of the FDRA field in the DCI format that is associated with a fourth serving cell is one of the predetermined values, and the third serving cell has a serving cell index that is smaller than a serving cell index of the fourth serving cell.

8. A user equipment (UE) comprising:

a transceiver configured to receive:

first information for a set of serving cells, a downlink control information (DCI) format, wherein the DCI format:

schedules reception of a physical downlink shared channel (PDSCH) on a first serving cell from the set of serving cells, includes a frequency domain resource allocation (FDRA) field providing a first value that is associated with the first serving cell and is different from predetermined values, and provides an indication for a dormant or a non-dormant active downlink (DL) bandwidth part (BWP) for each serving cell from second serving cells, wherein the indication is provided by values of first fields in the DCI format that are associated with a third serving cell from the set of serving cells when:

second fields are not present in the DCI format or are reserved, wherein the second fields include at least one of:

a dormancy indication field, a one-shot hybrid automatic repeat request acknowledgment (HARQ-ACK) request field, and a HARQ-ACK retransmission indicator field, and a third value of the FDRA field in the DCI format that is associated with the third serving cell is one of the predetermined values, and the PDSCH on the first serving cell; and a processor operably coupled with the transceiver, the processor configured to determine the dormant or non-dormant active DL BWP for each serving cell from the second serving cells based on the indication.

9. The UE of claim 8, wherein:

the DCI format is provided by a physical downlink control channel (PDCCH) reception on a primary cell (PCell); and the predetermined values are comprised of bits that are:

all equal to 0 for an FDRA type 0, all equal to 1 for an FDRA type 1, or all equal to either 0 or 1 for a dynamic switching of an FDRA type.

10. The UE of claim 8, wherein the indication is for a non-dormant DL BWP the first serving cell.

11. The UE of claim 8, wherein:

the transceiver is further configured to receive second information for a field type for an antenna ports (AP) field in the DCI format; and the processor is further configured to determine:

the AP field to be among the first fields, when the field type indicates that the AP field provides separate values for each serving cell from first serving cells including the first serving cell and the third serving cell, and the AP field not to be among the first fields, otherwise.

12. The UE of claim 8, wherein:

the processor is further configured to determine:

HARQ-ACK information bits corresponding to the DCI format, wherein the HARQ-ACK information bits are based on:

HARQ-ACK information corresponding to the PDSCH reception on the first serving cell, and a positive acknowledgement (ACK) bit corresponding to the indication and associated with the third serving cell, wherein an ordering of the HARQ-ACK information bits is based on an ascending order of serving cell index among the first serving cell and the third serving cell, and a HARQ-ACK codebook that includes the HARQ-ACK information; and the transceiver is further configured to transmit a physical uplink control channel (PUCCH) or a physical uplink shared channel (PUSCH) that provides the HARQ-ACK codebook.

13. The UE of claim 12, wherein:

the HARQ-ACK codebook is determined by appending a second HARQ-ACK sub-codebook to a first HARQ-ACK sub-codebook;

the first HARQ-ACK sub-codebook corresponds to first DCI formats, wherein a DCI format from the first DCI formats:

schedules a single PDSCH reception on a single serving cell, or is associated with HARQ-ACK information without scheduling a PDSCH reception;

the second HARQ-ACK sub-codebook corresponds to second DCI formats, wherein a DCI format from the second DCI formats schedules more than one PDSCH receptions on respective more than one serving cells; and the HARQ-ACK information is included in the second HARQ-ACK sub-codebook.

14. The UE of claim 12, wherein:

a fourth value of the FDRA field in the DCI format that is associated with a fourth serving cell is one of the predetermined values, and the third serving cell has a serving cell index that is smaller than a serving cell index of the fourth serving cell.

15. A base station comprising:

a transceiver configured to transmit:

first information for a set of serving cells, a downlink control information (DCI) format, wherein the DCI format:

schedules a transmission of a physical downlink shared channel (PDSCH) on a first serving cell from the set of serving cells, includes a frequency domain resource allocation (FDRA) field providing a first value that is associated with the first serving cell and is different from predetermined values, and provides an indication for a dormant or a non-dormant active downlink (DL) bandwidth part (BWP) for each serving cell from second serving cells, wherein the indication is provided by values of first fields in the DCI format that are associated with a third serving cell from the set of serving cells when:

second fields are not present in the DCI format or are reserved, wherein the second fields include at least one of:

a dormancy indication field, a one-shot hybrid automatic repeat request acknowledgment (HARQ-ACK) request field, and a HARQ-ACK retransmission indicator field, and a third value of the FDRA field in the DCI format that is associated with the third serving cell is one of the predetermined values, and the PDSCH on the first serving cell; and a processor operably coupled with the transceiver, the processor configured to determine the dormant or non-dormant active DL BWP for each serving cell from the second serving cells based on the indication.

16. The base station of claim 15, wherein:

the DCI format is provided by a physical downlink control channel (PDCCH) transmission on a primary cell (PCell); and the predetermined values are comprised of bits that are:

all equal to 0 for an FDRA type 0, all equal to 1 for an FDRA type 1, or all equal to either 0 or 1 for a dynamic switching of an FDRA type.

17. The base station of claim 15, wherein the indication is for a non-dormant DL BWP for the first serving cell.

18. The base station of claim 15, wherein:

the transceiver is further configured to transmit second information for a field type for an antenna ports (AP) field in the DCI format; and the processor is further configured to determine:

the AP field to be among the first fields when the field type indicates that the AP field provides separate values for each serving cell from first serving cells including the first serving cell and the third serving cell, and the AP field not to be among the first fields, otherwise.

19. The base station of claim 15, wherein:

the processor is further configured to determine:

HARQ-ACK information bits corresponding to the DCI format, wherein the HARQ-ACK information bits are based on:

HARQ-ACK information corresponding to the PDSCH transmission on the first serving cell, and a positive acknowledgement (ACK) bit corresponding to the indication and associated with the third serving cell, wherein an ordering of the HARQ-ACK information bits is based on an ascending order of serving cell index among the first serving cell and the third serving cell, and a HARQ-ACK codebook that includes the HARQ-ACK information; and the transceiver is further configured to receive a physical uplink control channel (PUCCH) or a physical uplink shared channel (PUSCH) that provides the HARQ-ACK codebook.

20. The base station of claim 19, wherein:

the HARQ-ACK codebook is determined by appending a second HARQ-ACK sub-codebook to a first HARQ-ACK sub-codebook;

the first HARQ-ACK sub-codebook corresponds to first DCI formats, wherein a DCI format from the first DCI formats:

schedules a single PDSCH transmission on a single serving cell, or is associated with HARQ-ACK information without scheduling a PDSCH transmission;

the second HARQ-ACK sub-codebook corresponds to second DCI formats, wherein a DCI format from the second DCI formats schedules more than one PDSCH transmissions on respective more than one serving cells;

the HARQ-ACK information is included in the second HARQ-ACK sub-codebook; and the third serving cell has a serving cell index that is smaller than a serving cell index of a fourth serving cell, when:

the DCI format includes a fourth value of the FDRA field, and the fourth value is associated with the fourth serving cell and is one of the predetermined values.

* * * * *